United States Patent [19]
Lo

[11] Patent Number: 6,023,476
[45] Date of Patent: Feb. 8, 2000

[54] SIGNAL DELAYS IN A LOGICAL REPEATER SET

[75] Inventor: William Lo, Santa Clara, Calif.

[73] Assignee: Advanced Micro Devices, Inc., Sunnyvale, Calif.

[21] Appl. No.: 08/791,180

[22] Filed: Jan. 31, 1997

[51] Int. Cl.[7] ............................................. H04L 12/413
[52] U.S. Cl. ..................... 370/502; 370/401; 370/462; 375/211
[58] Field of Search ................................... 370/274, 401, 370/445, 447, 448, 492, 501, 502, 517, 252, 461, 462, 402, 463; 375/221, 211, 212

[56] References Cited

U.S. PATENT DOCUMENTS

| 5,265,123 | 11/1993 | Vijeh . | |
| 5,293,375 | 3/1994 | Moorwood et al. . | |
| 5,384,767 | 1/1995 | Moorwood et al. | 370/252 |
| 5,430,762 | 7/1995 | Vijeh et al. | 375/211 |
| 5,600,651 | 2/1997 | Molle | 370/448 |
| 5,648,959 | 7/1997 | Hyadis et al. | 370/445 |
| 5,740,174 | 4/1998 | Somer | 370/402 |
| 5,771,235 | 6/1998 | Tang et al. | 370/446 |
| 5,850,525 | 12/1998 | Kalkunte et al. | 395/200 |

OTHER PUBLICATIONS

U.S. Patent Application No. 08/791,587, pending, filed Jan. 31, 1997, by William Lo, entitled "Repeater Delay Balancing."

Primary Examiner—Ricky Ngo
Attorney, Agent, or Firm—Fliesler, Dubb, Meyer & Lovejoy LLP

[57] ABSTRACT

A logical repeater set provides for delaying a character of data that passes through the logical repeater set from a receive channel in a receiving repeater set to a set of transmit channels in transmitting repeater sets. In providing for the delay of a character, the receiving repeater set calculates a receive channel character delay value, and receives a character that is to be provided on a transmit channel. The receiving repeater set then delays the character for a period of time equal to the receive channel character delay value and providing the character to the transmitting repeater set. Each transmitting repeater set further calculates a set of transmit channel character delay values for a set of transceivers. Each transmitting repeater set receives a character from the receiving repeater set that is to be provided on a transmit channel and further delays the character by a transmit channel character delay value. A receiving repeater set and transmitting repeater set may be either the same repeater set or a pair of repeater sets that are coupled together via an expansion bus.

41 Claims, 23 Drawing Sheets

1

SIGNAL DELAYS IN A LOGICAL REPEATER SET

BACKGROUND OF THE INVENTION

A. Field of Invention

The present invention generally relates to repeaters for use in a communications network. More particularly, the present invention is directed towards combining multiple repeater sets to form a single logical repeater set.

B. Description of Related Art

FIG. 1 illustrates a traditional repeater set 100, including a repeater unit 101 and a set of transceivers $102_{1-X}$. A repeater set 100 as shown in FIG. 1 may be designed for use in a communications network that conforms to the Institute of Electrical and Electronics Engineers ("IEEE") 802.3u standard for a 100 Megabit per second ("Mb/s") Ethernet communications network. A specification for a repeater set 100 in an IEEE 802.3u communications network may be found in the *IEEE Standards for Local and Metropolitan Area Networks: Supplement to Carrier Sense Multiple Access with Collision Detection (CSMA/CD) Access Method and Physical Layer Specifications, Media Access Control (MAC) Parameters, Physical Layer, Medium Attachment Units, and Repeater for 100Mb/s Operation, Type 100BASE-T (Clauses 21–30)*, The Institute of Electrical and Electronics Engineers, Inc., 345 East 47th Street, New York, N.Y. 10017-2394, USA, 1995 ("IEEE 802.3u Standard"), which is hereby incorporated by reference.

Each transceiver $102_{1-X}$ may be coupled to a physical medium such as a cable or bus for the purpose of transmitting data onto the physical medium and receiving data from the physical medium. Each transceiver may be coupled to a physical medium via a respective medium dependent interface ("MDI") $103_{1-X}$ that supports one of the physical signaling standards set forth in the IEEE 802.3u Standard.

Each transceiver $102_{1-X}$ also has a set of receive channel $RX_{1-X}$, transmit channel $TX_{1-X}$, and control $C_{1-X}$ signals that are coupled to the repeater unit 101. The transmit channel $TX_{1-X}$, receive channel $RX_{1-X}$, and control $C_{1-X}$ signals for each transceiver $102_{1-X}$ may conform to the medium independent interface ("MII") $104_{1-X}$ set forth in the IEEE 802.3u standard or another suitable interface.

In operation, one of the transceivers $102_1$ begins receiving data from a physical medium via the MDI $103_1$. The transceiver $102_1$ then begins to provide the received data to the repeater unit 101 via the receive channel signals $RX_1$ on the MII $104_1$. The repeater unit 101 then transmits the data received from the first transceiver $102_1$ to all of the other transceivers $102_{2-X}$ coupled to the repeater unit 101.

The repeater unit 101 performs this transmission over the transmit channel $TX_{1-X}$ signals of each MII $104_{2-X}$. The transceivers $102_{2-X}$ then transmit the data received on their transmit channels $TX_{2-X}$ onto a respective physical medium via a respective MDI $103_{2-X}$. Each MDI $103_{1-X}$ may also be coupled through a physical medium to a piece of data terminal equipment ("DTE"), such as a computer, which sources information onto the MDI 103 and receives information from the MDI 103.

If more than one transceiver $102_{1-X}$ receives data on a MDI $103_{1-X}$ and provides the data to the repeater unit 101 on a receive channel $RX_{1-X}$, the repeater unit 101 identifies that a collision is taking place. In response to detecting the collision, the repeater unit 101 causes a JAM message to be transmitted onto each MDI $103_{1-X}$. This may be achieved by providing a JAM message on the transmit channel $TX_{1-X}$ that is coupled to each of the transceivers $102_{1-X}$. Each transceiver $102_{1-X}$ then propagates the JAM message onto a respective physical medium via the MDI $103_{1-X}$.

The IEEE 802.3u Standard specifies two classes of repeaters. Class I repeaters are defined as being:

A type of repeater set specified such that in a maximum length segment topology, only one such repeater set may exist between any two DTE's within a single collision domain. IEEE 802.3u Standard, Clause 27.1.1.3.

Class II repeaters are defined as being:

A type of repeater set specified such that in a maximum length segment topology, only two such repeater sets may exist between any two DTE's within a single collision domain. IEEE 802.3u Standard, Clause 27.1.1.3.

The limitation in the number of repeater sets that may exist between two DTE's makes it desirable to have repeater sets that have a large number of ports. In order to provide for the construction of such a repeater set, it is desirable to provide for linking multiple repeater sets together to form a single logical repeater.

FIG. 2 illustrates a single logical repeater set 130, which includes a first repeater set 110, and a second repeater set 120. The first repeater set 110 and second repeater set 120 each include a repeater unit 111, 121 and transceivers $112_{1-X}$, $122_{1-X}$, as described above for repeater set 100.

Each repeater set 110, 120 also includes an expansion port 115, 125, which provides for linking the repeater sets 110, 120 to form the single logical repeater set 130. Each expansion port 115, 125 is coupled to an expansion bus 131, which enables the transfer of information and control signals between the repeater sets 110, 120. An arbiter 132 is also coupled to each expansion port 115, 125 for determining which repeater set 110, 120 will drive the expansion bus 131.

In operation, the expansion ports 115, 125 enable the repeater unit 111, 121 of each repeater set 110, 120 to be linked, so that the repeater sets 110, 120 operate as the single logical repeater set 130. As a result, the ports formed by transceivers $112_{1-X}$ and transceivers $122_{1-X}$ will function as though they all exist on the same repeater set.

In order for the single logical repeater set 130 to operate properly, it is desirable to avoid contention on the expansion bus 131. Contention on the expansion bus 131 may result in the corruption of data being transferred in the logical repeater set 130 or improper handling of a collision.

The IEEE 802.3u Standard also defines the following parameters for a repeater set 100:

Start-of-Packet Propagation Delay ("SOP"): The delay between the start of a packet of data being received on a receiving transceiver's MDI to the start of the packet of data being transmitted on a transmitting transceiver's MDI. IEEE 802.3u Standard, Clause 27.3.1.3.3.

Start-of-Collision JAM Propagation Delay ("SOJ"): The time delay between the start of the second packet in a collision arriving at the MDI of a transceiver and the start of the JAM message being transmitted onto the MDI of all transceivers. IEEE 802.3u Standard, Clause 27.3.1.4.3.

Cessation-of-Collision JAM Propagation Delay ("EOJ"): The time delay between the end of a packet, which causes the repeater unit to cause the JAM message to no longer be transmitted by a transceiver, and the JAM no longer being transmitted on the MDI of the transceiver. IEEE 802.3u Standard, Clause 27.3.1.4.4.

For Class I repeaters, the sum of SOP and SOJ must not exceed 140 bit times, in order to comply with the IEEE 802.3u Standard. For Class II repeaters, the IEEE 802.3u Standard requires that the sum of SOP and SOJ must not exceed 67 bit times when the physical medium is 100BASE-T4 type. For Class II repeaters, the IEEE 802.3u Standard requires that neither SOP nor SOJ exceed 46 bit times in 100BASE-TX and 100BASE-FX physical medium types.

For both Class I and Class II repeater sets, such as repeater set 100 and single logical repeater set 130, the IEEE 802.3u Standard specifies that EOJ be less than or equal to SOP for each port in the repeater set. This requirement assures that the end of a collision JAM message is propagated to all DTE's on a communications network before a new packet of data is received by a DTE on the communications network. This prevents the new packet of data from merging with the JAM message and being corrupted.

Accordingly, it is desirable to have a mechanism for use with a single logical repeater set that allows for balancing the SOP and EOJ delay parameters so that EOJ is less than or equal to SOP for each port of the logical repeater set.

SUMMARY OF THE INVENTION

The present invention provides for the operation of discrete repeater sets to form a single logical repeater set. Aspects of the present invention provide for inhibiting contention on the expansion bus of a single logical repeater. Further aspects of the present invention provide for balancing the delay through a single logical repeater set, so that EOJ is less than or equal to SOP for each port of the logical repeater set.

The present invention provides for delaying a character of data that passes through a logical repeater set from one receive channel to a set of transmit channels. In providing for the delay, a receiving repeater set in the logical repeater may determine a receive channel character delay value. The repeater set may also receive a data character from the receive channel and delay the character for a period of time equal to the receive channel character delay value.

A transmitting repeater set may also determine a transmit channel character delay value. The transmitting repeater set will then delay the character for a period of time equal to the transmit channel character delay value. In all, the character is delayed by the sum of the transmit channel character delay value and the receive channel character delay value. The transmitting repeater set and the receiving repeater set may be the same repeater set. Alternatively, the transmitting repeater set and receiving repeater set may be different repeater sets that are coupled together within a logical repeater set. Each repeater set can include an expansion port that enables the repeater set to be coupled to other repeater sets within the logical repeater set.

Each repeater set will include a delay generator circuit coupled to a repeater unit which is coupled to a plurality of transceivers. Each one of the plurality of transceivers will have a receive channel coupled to the repeater unit and a transmit channel coupled to the repeater unit. The delay generator circuit will then include a receive channel delay module and a receive channel delay calculator as well as a transmit channel delay module and a transmit channel delay calculator.

The receive channel delay calculator determines a receive channel character delay value and provides it on an output. The receive channel delay module has a data input coupled to the repeater unit to receive a character to be delayed, a delay input coupled to the output of the receive channel delay calculator, and an output providing a delayed version of the received character. The receive channel delay module delays the character received from the repeater unit in response to the receive channel character delay value. The delayed version of the character is provided to an output which may be an expansion port.

The transmit channel delay calculator has an output for providing a transmit channel character delay value. The transmit channel delay module has a data input receiving a character to be delayed from the repeater unit, a delay input coupled to the output of the transmit channel delay calculator, and an output coupled to the repeater unit for providing a delayed version of the character. In operation, the transmit channel delay module delays the character in response to the transmit channel character delay value.

BRIEF DESCRIPTION OF THE DRAWINGS

Further details of the present invention are explained with the help of the attached drawings in which.

DETAILED DESCRIPTION

A. Introduction to the Single Logical Repeater Set

In combining multiple discrete repeater sets to form a single logical repeater set, contention should be avoided on an expansion bus coupling the repeater sets. Further, compliance with the IEEE 802.3u Standard requires the EOJ to be less than or equal to the SOP for each port of the logical repeater set, regardless of which transceiver is supplying data to the repeater set. For example, the EOJ for a first port of the logical repeater set must be less than or equal to an SOP for data being transmitted out of the first port, regardless of which port is providing data to a repeater unit.

Figure 3:
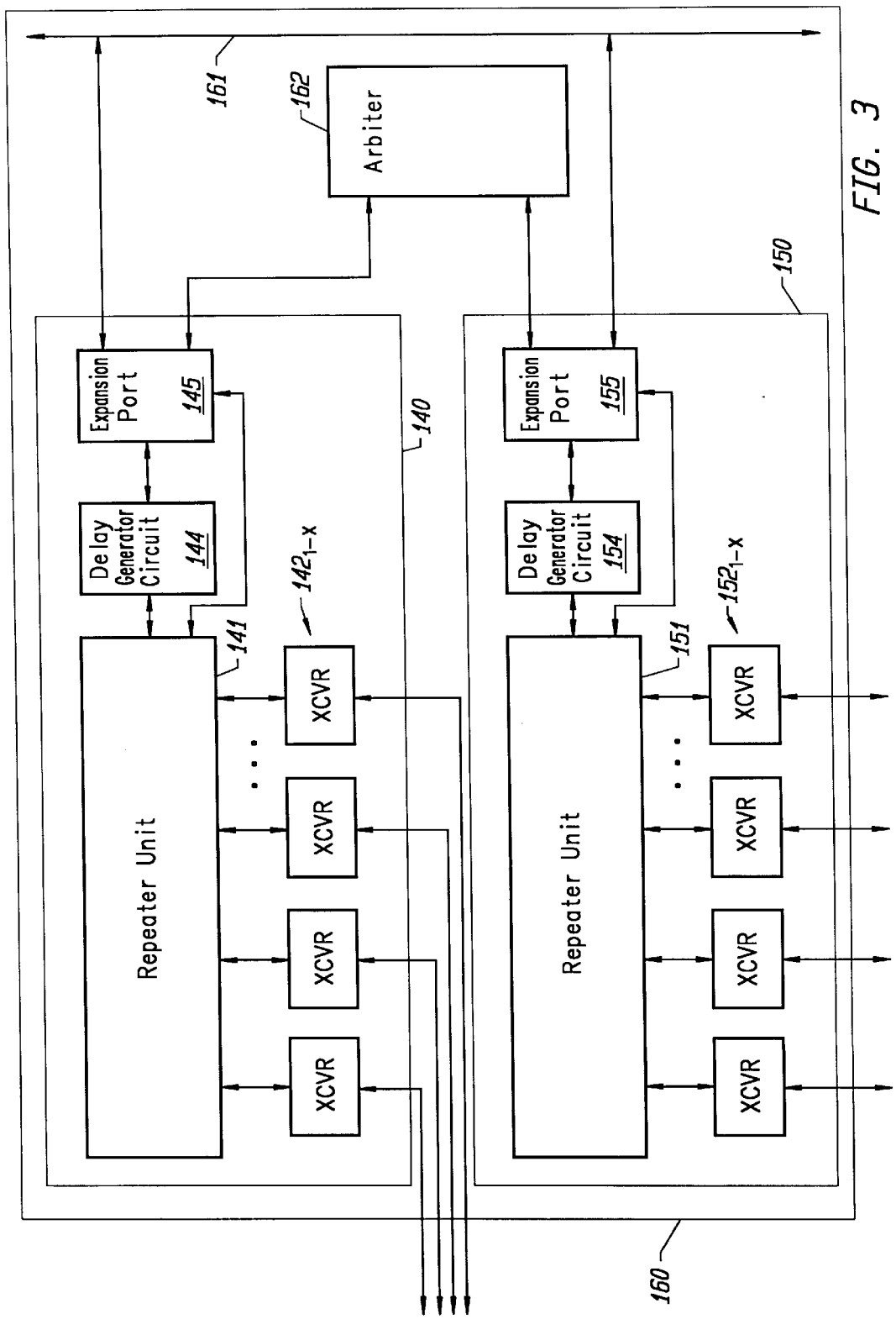
FIG. 3 illustrates two repeater sets that are coupled together to form a single logical repeater set, which provides for signal delays, in accordance with the present invention.

FIG. 3 illustrates a single logical repeater set 160 that is formed by two discrete repeater sets 140, 150, which are coupled together. The repeaters sets 140, 150 are coupled together by an expansion bus 161, which provides for the transfer of information and control signals between the repeater sets 140, 150. An arbiter 162 is coupled to each repeater set 140, 150 to determine which repeater set 140, 150 will be enabled to drive the expansion bus 161.

Although repeater set 160 is formed by two discrete repeater sets 140, 150, a single logical repeater may be formed from any number of discrete repeater sets. For the purpose of this patent application, a single logical repeater set shall also be understood to include a single discrete repeater set, such as repeater set 140 or 150.

Each repeater set 140, 150 includes a set of transceivers $142_{1-X}$, $152_{1-X}$ that are coupled to a repeater unit 141, 151, which is coupled to a delay generator circuit 144, 154. The delay generator circuit 144, 154 is coupled to an expansion port 145, 155, which provides for coupling the repeater set 140, 150 to the arbiter 162 and the expansion bus 161.

In accordance with the present invention, the delay generator circuit 144, 154 may provide for establishing a temporal relationship between the EOJ and SOP for each port of the repeater set 140, 150, so that EOJ is less than or equal to SOP for each port in the logical repeater set 160. Further, the delay generator circuit 144, 154 may provide an arbiter delay, which enables contention to be avoided on the expansion bus 161.

Figure 4:
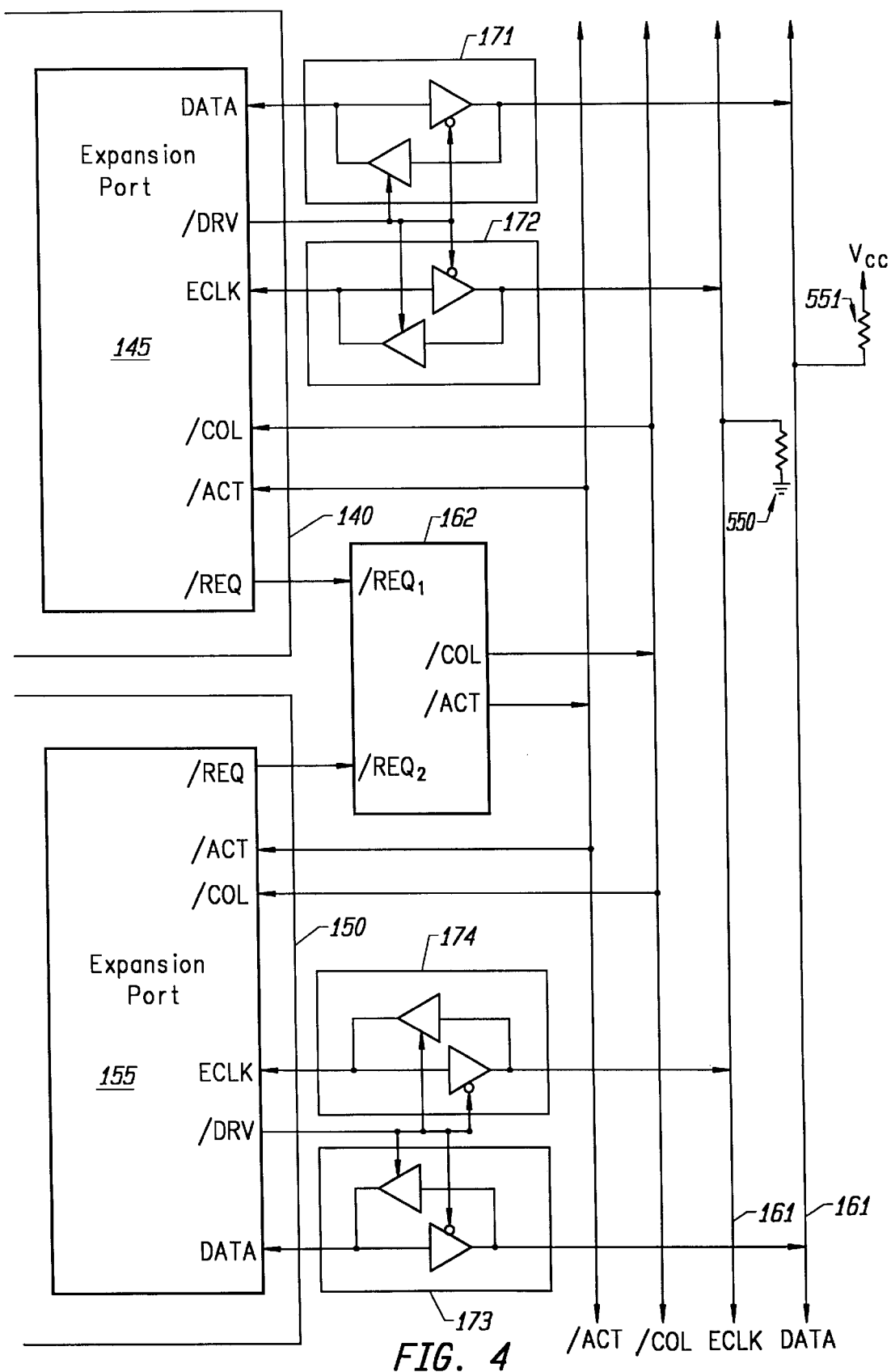
FIG. 4 illustrates the expansion bus and arbiter in FIG. 3.

FIG. 4 provides a more detailed illustration of an interface between the repeater sets' expansion ports 145, 155, the arbiter 162 and the expansion bus 161. The expansion port 145, 155 for each repeater set 140, 150 includes the following signals:

DATA: A bidirectional signal that transfers data and control information between the expansion port and the expansion bus 161;

ECLK: A bidirectional signal that serves as a timing reference clock for the DATA signal;

/REO: An output that is asserted to indicate that the repeater set 140, 150 has information to be placed on the expansion bus 161, such as an incoming data packet. The "/" will be used in this application to indicate a low asserted logic signal;

/ACT: An input that indicates one or more repeater sets 140, 150 are requesting access to the expansion bus 161;

/COL: An input that indicates when two or more repeater sets are requesting access to the expansion bus 161; and /DRV: An output that is asserted when the repeater set is driving the DATA signal on the expansion bus 161.

In one embodiment of the present invention, DATA is a signal consisting of 5 parallel bits. The /DRV signal may be employed to enable buffers external to a repeater set that can be employed if necessary on the DATA and ECLK signals for driving the expansion bus 161.

The expansion bus 161 includes a DATA signal and ECLK signal which correspond to the expansion port's DATA signal and ECLK signal, respectively. Each expansion port's DATA signal is coupled to the DATA signal on the expansion bus 161, and each expansion port's ECLK signal is coupled to the ECLK signal on the expansion bus 161. The DATA signal on the expansion bus 161 is coupled to Vcc through a set of pull-up resistors 551, and the ECLK signal on the expansion bus 161 is coupled to ground through a pull-down resistor 550. The pull-up resistors 551 set the DATA signal to Vcc when no repeater set is driving the expansion bus 161, and the pull-down resistor 551 sets the ECLK signal to ground when no repeater set is driving the expansion bus 161.

In one embodiment of the present invention, the expansion port's DATA and ECLK signals are coupled to the expansion port through bidirectional buffers. This may be done if the expansion bus 161 requires significant amounts of driving current. Alternatively, the expansion port's bidirectional DATA and ECLK signals may be directly connected to the expansion bus 161.

In FIG. 4, the DATA signal and ECLK signal from expansion port 145 are coupled to the expansion bus by bidirectional buffers 171 and 172, respectively. A directional input for each of the buffers 171, 172 is coupled to the /DRV signal provided by expansion port 145. When /DRV is asserted, the buffers 171, 172 are enabled for driving the expansion bus 161. Otherwise, the buffers 171, 172 are enabled to receive the DATA and ECLK signals from the expansion bus 161.

The DATA signal and ECLK signal from expansion port 155 are coupled to the expansion bus by bidirectional buffers 173 and 174, respectively. A directional input for each of the buffers 173, 174 is coupled to the /DRV signal provided by expansion port 155. When /DRV is asserted, the buffers 173, 174 are enabled for driving the expansion bus 161. Otherwise, the buffers 173, 174 are enabled to receive the DATA and ECLK signals from the expansion bus 161. The arbiter 162 includes a set of /REQ inputs (/REQ$_1$, /REQ$_2$). Each /REQ input is coupled to a corresponding /REQ output from an expansion port 145, 155. The arbiter 162 provides an /ACT signal and a /COL signal. The arbiter's /ACT signal is coupled to the /ACT input of each expansion port 145, 155, and the arbiter's /COL signal is coupled to the /COL input of each expansion port 145, 155.

In operation, the arbiter 162 asserts /ACT whenever one or more of the arbiter's /REQ inputs are asserted. The arbiter 162 asserts /COL whenever more than one of the arbiter's /REQ inputs are asserted.

When a repeater set wishes to drive the DATA signal and ECLK signal on the expansion bus 161, the repeater set's expansion port asserts the /REQ signal. The expansion port will drive the DATA signal and ECLK signal when the /REQ output is asserted, the /ACT input is asserted, the /COL input is deasserted, and an arbiter time delay "SOP(A)" has elapsed from the time that /REQ output was asserted.

The arbiter time delay should be at least as large as the time that it takes the arbiter 162 to correctly set the /ACT and /COL signals in response to the assertion of a /REQ signal from any one or group of the repeater units. As a result, no repeater will inadvertently believe that it is being granted an /ACT signal to drive the expansion bus, when a collision is occurring because more than one repeater set is requesting the expansion bus 161.

For example, a repeater set 140 may have asserted its /REQ signal and the arbiter 162 may have asserted /ACT. Subsequently, repeater set 150 may assert its /REQ signal, thereby causing a collision. The expansion port 155 in repeater 150 may recognize the asserted /ACT signal before the arbiter 162 is able to assert the /COL signal. As a result, repeater 150 may begin to drive the expansion bus 161, thereby causing contention on the expansion bus 161.

However, if repeater 150 waits an arbiter time delay before driving the bus 161, the arbiter 162 will have an opportunity to assert the /COL signal prior to repeater 150 driving the expansion bus 161. Accordingly, repeater 150 will not begin to drive the expansion bus 161 and contention will be avoided. Further, the arbiter time delay may be programmable, so that the designer of the logical repeater set 160 may select repeater sets and system layouts that result in any one of a number of different arbiter delays.

As stated above, conformance with the IEEE 802.3u Standard requires that EOJ be less than or equal to SOP for each port in the logical repeater set 160. Both the SOP and EOJ for each port may be broken down into smaller components. The SOP for a port of a traditional repeater set 100 may be calculated as follows:

$$SOP=SOP(rx)+SOP(tx)+SOP(ru)$$

wherein:
SOP(rx) is the portion of the SOP that is contributed by a transceiver, which is providing data to the repeater unit;
SOP(tx) is the portion of the SOP that is contributed by a transceiver, which is transmitting data out of the repeater set; and
SOP(ru) is the portion of the SOP that is contributed by the repeater unit.

Both SOP(rx) and SOP(tx) are unique to each transceiver. SOP(ru) may be the same for all the SOP calculations relating to ports in a repeater set that are controlled by the same repeater unit.

In accordance with the present invention, SOP for each port in a single logical repeater may be calculated as follows:

$$SOP=SOP(rx)+SOP(tx)+SOP(rc)+SOP(tc)+CDV$$

wherein:
SOP(rc) is the portion of SOP contributed by the repeater unit and expansion port in a repeater set in which the reception of a data packet was initiated;
SOP(tc) is the portion of SOP contributed by the repeater unit and expansion port in a repeater set transmitting data out of the logical repeater set.
CDV is a character delay value calculated by a delay generator circuit in one or more of the repeater sets in the logical repeater sets.

In accordance with the present invention, the character delay value may include a component for the arbiter time delay. Additionally, the character delay value may include a component for establishing a temporal relationship between EOJ and SOP, so that EOJ is less than or equal to SOP for each port in the logical repeater set 160.

The EOJ for each port in a traditional repeater set 100 may be calculated as follows:

$$EOJ=EOJ(rx)+EOJ(tx)+EOJ(ru)$$

wherein:
EOJ(rx) is the portion of the EOJ that is contributed by a transceiver, which is providing data to the repeater unit;
EOJ(tx) is the portion of the EOJ that is contributed by a transceiver, which is transmitting data out of the repeater set; and
EOJ(ru) is the portion of the EOJ that is contributed by the repeater unit.

Both EOJ(rx) and EOJ(tx) are unique to each transceiver. EOJ(ru) may be the same for all EOJ calculations for the ports in a repeater set that are controlled by the same repeater unit.

In a single logical repeater set, in accordance with the present invention, the EOJ for each port may be calculated as follows:

$$EOJ=EOJ(rx)+EOJ(tx)+EOJ(rc)+EOJ(tc)$$

wherein:
EOJ(rc) is the portion of the EOJ that is contributed by the repeater unit and expansion port in a repeater set in which the reception of a data packet was initiated; and
EOJ(tc) is the portion of the EOJ that is contributed by the repeater unit and expansion port in a repeater set that is transmitting data out of the logical repeater set.

B. Character Delay Values

When the logical repeater set 160 is in operation, a unique character delay value may be calculated for each port. The character delay value for each port indicates the period of time for which a data character should be delayed in the logical repeater set 160 to provide for EOJ being less than or equal to SOP for the port. The character delay value may also provide for introducing the arbiter time delay.

When a data character is received by a port in a receiving repeater set 140, 150 in the logical repeater set 160, the character is transferred to the delay generator circuit 144, 154. The receiving repeater set is the repeater set that includes the port that receives the data character. The delay generator circuit 144, 154 delays the character for a portion of the character delay value. The delay of a character may be achieved by storing the character in a register for the portion of the character delay value period of time.

The character is then transferred to the expansion port 145, 155. The expansion port transfers the character onto the expansion bus 161, and the character is received by a transmitting repeater set 140, 150. The transmitting repeater set is a repeater set that transmits the data character out of the logical repeater set 160.

In the transmitting repeater set 140, 150, the expansion port 145, 155 and repeater unit 141, 151 receive the character. The delay generator circuit 144, 154 in the transmitting repeater set 140, 150 receives the character from the repeater unit 141, 151. The delay generator circuit 144, 154 then delays the character for the remainder of the character delay value. The character is then passed back to the repeater unit 141, 151 in the transmitting repeater set 140, 150. The repeater unit 141, 151 forwards the character to at least one transceiver for transmission out of the logical repeater set 160.

The receiving repeater set and the transmitting repeater set may be different repeater sets within the logical repeater set 160. Alternatively, the receiving repeater set and the transmitting repeater set may be the same repeater set.

The character delay value may be expressed as follows:

$$CDV=RCDV+TCDV$$

wherein:
RCDV is the receive channel character delay value, which is implemented by the delay generator circuit in a receiving repeater set; and
TCDV is the transmit channel character delay value, which is implemented by the delay generator circuit in a transmitting repeater set.

In implementing the character delay value, the actual total character delay value does not need to be calculated. It is possible to only calculate a receive channel character delay value and a transmit channel character delay value. The delay generator circuit will then implement these two delays independently.

One method of calculating a receive channel character delay value is to first calculate a receive channel bit delay value. The receive channel bit delay value can then be converted into a receive channel character delay value.

A receive channel bit delay value indicates the period of time that each bit in a data character should be delayed in a receiving repeater set in addition to SOP(rc) and SOP(rx). A receive channel bit delay value may be calculated for a repeater set, according to the following equation:

$$RBDV = MAX\_EOJ\_R + EOJ(rc) - SOP(rx) + SOP(A) - SOP(rc) \text{ if}$$
$$MAX\_EOJ\_R + EOJ(rc) - SOP(rx) + SOP(A) - SOP(rc) \text{ is greater than 0, else } RBDV = 0 \quad \text{Equation 1}$$

wherein:

RBDV is the receive bit delay value for the repeater set;

MAX_EOJ_R is a value equal to the largest EOJ(rx) value possessed by any of the transceivers in a logical repeater set that includes the repeater set;

SOP(rx) is a value equal to the a SOP value of a receive channel of a transceiver in the repeater set that is providing information to the repeater unit;

SOP(A) is an arbiter time delay for the arbiter in the logical repeater set, if the logical repeater set includes an arbiter;

EOJ(rc) is the EOJ value for the repeater unit and expansion port in the repeater set; and SOP(rc) is the SOP value for the repeater unit and expansion port in the repeater set.

The receive bit delay value ("RBDV") may be expressed in many different types of measurements. In one embodiment of the present invention, RBDV is expressed in number of bit times, where a bit time is a period of time required to transmit one bit of the character on a physical medium.

Each receive bit delay value may be converted into a receive character delay value for the repeater set, according to the following equation:

$$RCDV = INT[RBDV/B], \text{ if } INT[RBDV/B] \text{ is less than or equal to } Q, \text{ else } RCDV = Q. \quad \text{Equation 2}$$

wherein:

RCDV is the receive channel character delay value;

B is the number of data bits representing the character that is being delayed;

INT[RBDV/B] is equal to the quotient of RBDV divided by B, if the quotient is an integer, else INT[RBDV/B] is equal to the integer portion of the quotient plus 1; and Q is a maximum allowable number of delay periods.

In accordance with the present invention, a delay period may be equal to any period of time. In one embodiment of the present invention, the delay period is equal to one character time, which is a period of time required to transmit one character on a physical medium. In one embodiment of the present invention, characters in a data packet are transmitted at a frequency of 25 Mhz.

In one embodiment of the present invention, B is equal to 4 and Q is equal to 15. In an alternate embodiments of the present invention, there may be no maximum allowable number of delay periods, in which case the following equation is used to convert the bit delay value into the character delay value:

$$RCDV = INT[RBDV/B]. \quad \text{Equation 3}$$

One method of calculating a transmit channel character delay value is to first calculate a transmit channel bit delay value. The transmit channel bit delay value may then be converted into a transmit channel character delay value.

A transmit channel bit delay value indicates the period of time that each bit in a data character should be delayed by the transmitting repeater set in addition to SOP(tc) and SOP(tx). A transmit channel bit delay value may be calculated for a port in a repeater set in a logical repeater set, according to the following equation:

$$TBDV = MAX\_EOJ\_T + EOJ(tc) - SOP(tx) - SOP(tc) \text{ if}$$
$$MAX\_EOJ\_T + EOJ(tc) - SOP(tx) - SOP(tc) \text{ is greater than 0, else } TBDV = 0 \quad \text{Equation 4}$$

wherein:

TBDV is the bit delay value for the port in the repeater set;

MAX_EOJ_T is a value equal to the largest EOJ(tx) value possessed by any of the transceivers in the logical repeater set;

SOP(tx) is a SOP value of a transmit channel in the repeater set port transceiver for which TBDV is being calculated;

EOJ(rc) is the EOJ value for the repeater unit and expansion port in the repeater set containing the port for which TBDV is being calculated; and SOP(rc) is the SOP value for the repeater unit and expansion port in the repeater set containing the port for which TBDV is being calculated.

The transmit channel bit delay value ("TBDV") may also be expressed in many different types of measurements. In one embodiment of the present invention, TBDV is expressed in number of bit times, where a bit time is a period of time required to transmit one bit of the character on a physical medium.

Each transmit channel bit delay value may be converted into a character delay value for the port, according to the following equation:

$$TCDV = INT[TBDV/B], \text{ if } INT[TBDV/B] \text{ is less than or equal to } Q, \text{ else } TCDV = Q. \quad \text{Equation 5}$$

wherein:

TCDV is the transmit channel character delay value;

B is the number of data bits representing the character that is being delayed;

INT[TBDV/B] is equal to the quotient of TBDV divided by B, if the quotient is an integer, else INT [TBDV/B] is equal to the integer portion of the quotient plus 1; and Q is a maximum allowable number of delay periods.

In one embodiment of the present invention, B is equal to 4 and Q is equal to 15. In an alternate embodiments of the present invention, there may be no maximum allowable number of delay periods, in which case the following equation is used to convert the bit delay value into the character delay value:

$$TCDV = INT[TBDV/B]. \quad \text{Equation 6}$$

In order to comply with the IEEE 802.3u Standard, the receive channel character delay value and transmit channel character delay value must be set so that the maximum bit time delays for EOJ and SOP are not violated.

In some cases, it may not be desirable to implement the delay for establishing the temporal relationship between EOJ and SOP that is called for by the IEEE 802.3u Standard. Such cases may occur when the logical repeater set is not going to be used in a fully compliant IEEE 802.3u network. However, it may still be desirable to implement an arbiter time delay to avoid contention on the expansion bus 161.

In such a case, the transmit channel character delay value may be set to zero, and the receive channel character delay value may be set to equal the arbiter time delay (RCDV= SOP(A)).

Alternatively, it may be desirable to provide for the IEEE 802.3u Standard's temporal relationship between EOJ and SOP, while at the same time not including an arbiter time delay. This situation may arise when the logical repeater set only includes a single repeater set, thereby eliminating the need for either an arbiter 162 or an expansion bus 161.

In such a case, the arbiter time delay (SOP(A)) may be set to zero. As a result, EOJ will be less than or equal to SOP for each port of the repeater set when the receive channel character delay value and transmit channel character delay value are implemented.

C. A Repeater Set

1. Overview

Figure 5:
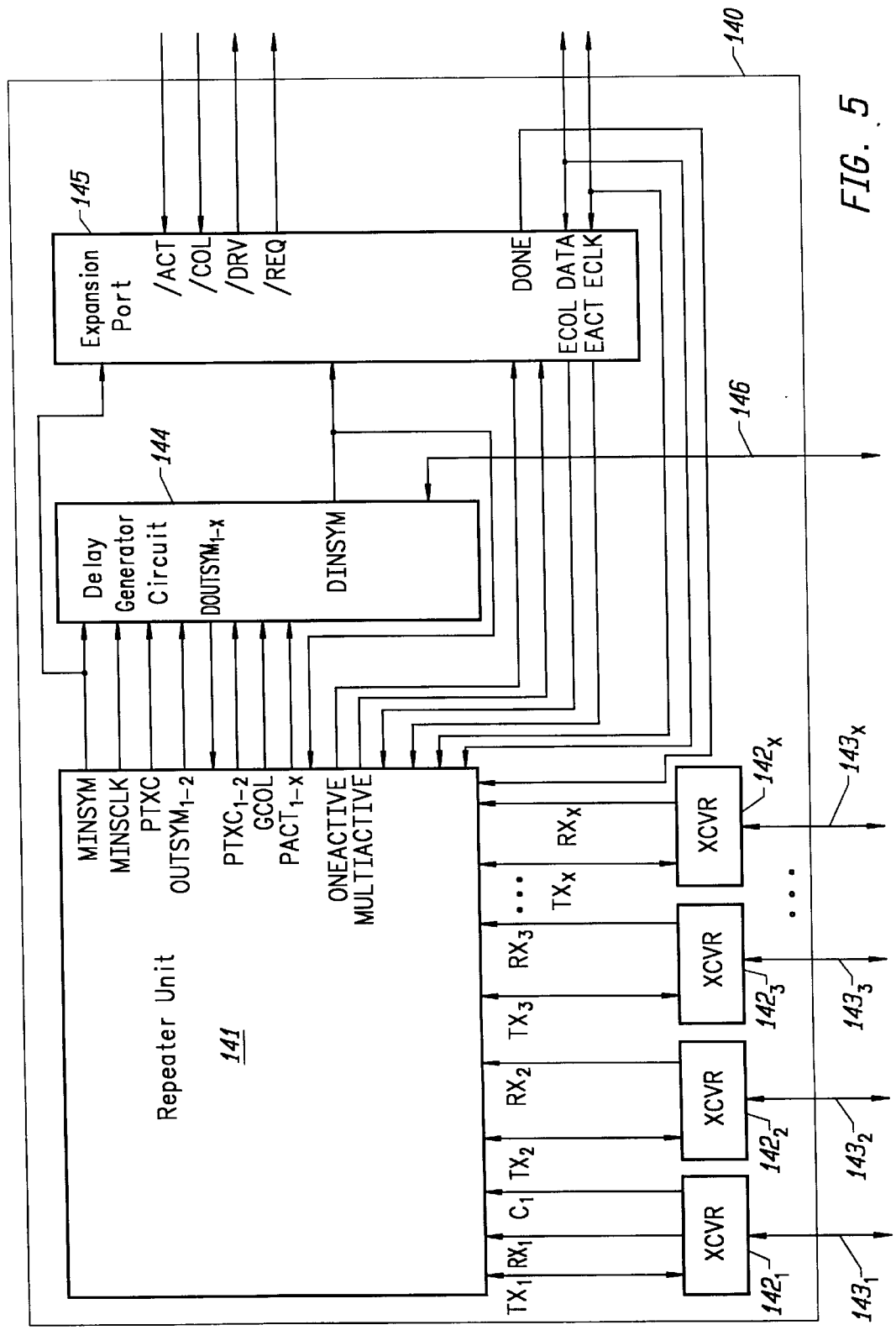
FIG. 5 illustrates a repeater set in accordance with the present invention, which may be employed along with other repeater sets to form a single logical repeater set.

FIG. 5 illustrates a block diagram of a repeater set 140 that may be employed along with other repeater sets 150 to form a single logical repeater 160. During the reception of a data packet, data is received by an MDI $143_{1-X}$ and passed to the repeater unit 141 through a transceiver $142_{1-X}$. The repeater unit passes the incoming data to the delay generator circuit 144 via the MINSYM signal.

The delay generator circuit 144 delays each character in the data for a receive channel character delay value. The delayed data is provided to the expansion port 145 via the DINSYM signal. The expansion port 145 requests access to the expansion bus 161. Once access is granted, the delayed data is transferred to the expansion bus via the expansion bus data interface signal ("DATA").

The DATA signal is also provided to the repeater unit 141. The DATA signal may be provided by the expansion port 145 or another repeater set 150 via the expansion bus 161. The data received by the repeater unit 141 is then transferred to the delay generator circuit via the set of $OUTSYM_{1-2}$ signals.

The delay generator circuit 144 delays the characters received on each set of $OUTSYM_{1-2}$ signals for the transmit channel character delay value. The delayed characters are then passed back to the repeater unit 141 via the set of DOUTSYM signals ("$DOUTSYM_{1-X}$"). The repeater unit 141 provides each DOUTSYM signal to a respective transceiver$1^{42}{}_{1-X}$ for transmission onto a respective MDI $143_{1-X}$.

Figure 1:
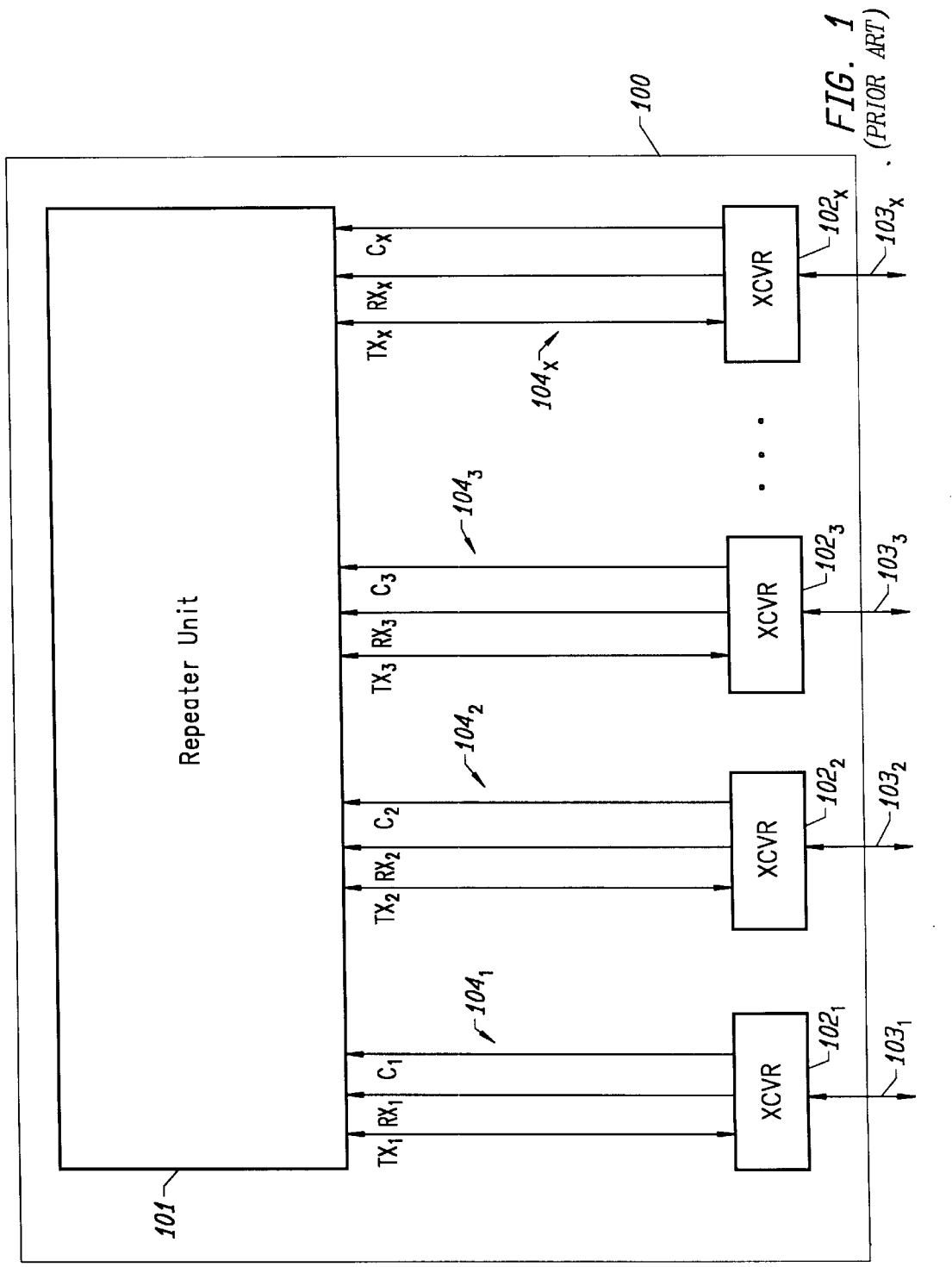
FIG. 1 illustrates a traditional repeater set.
Figure 2:
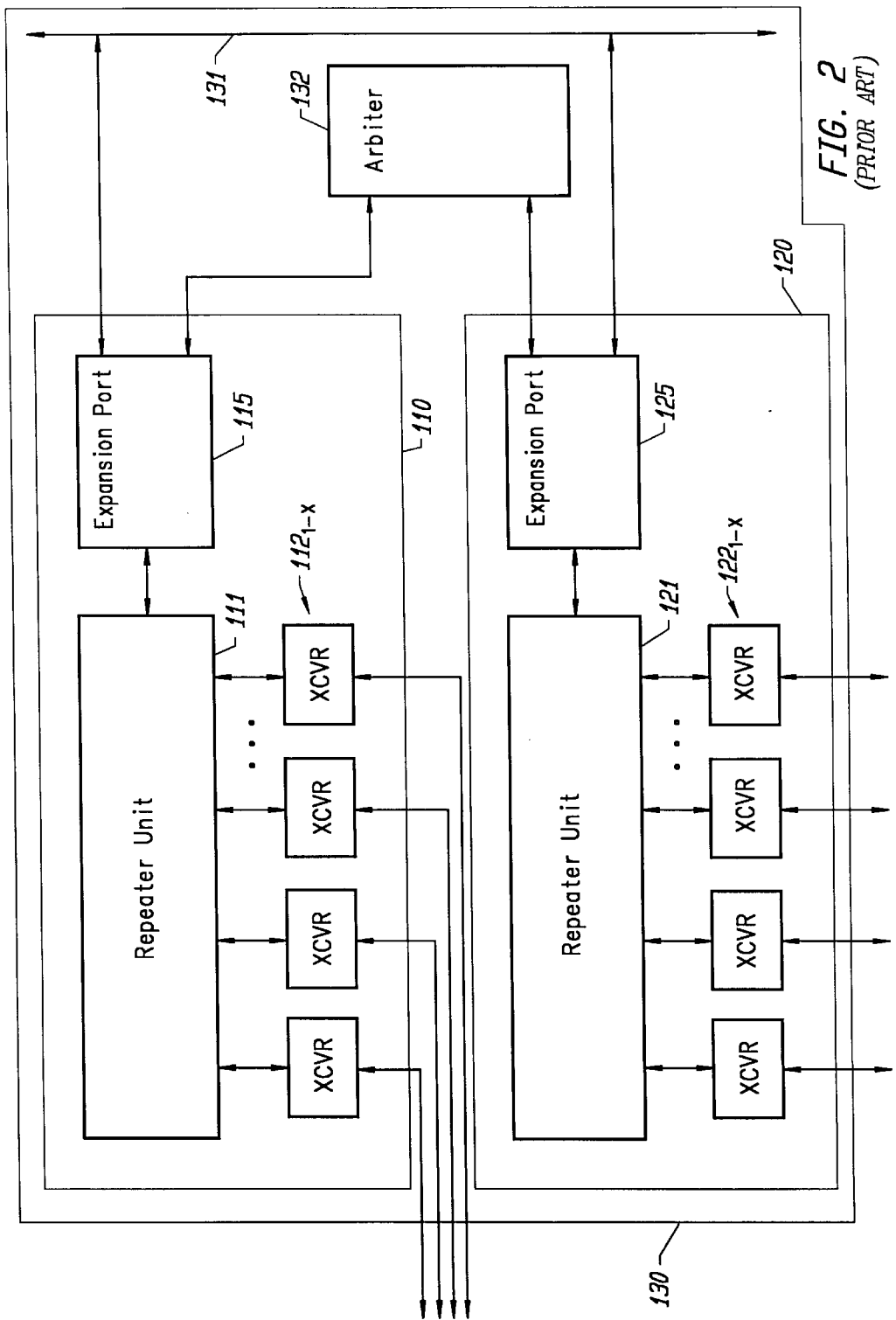
FIG. 2 illustrates two repeater sets that are coupled together to form a single logical repeater set.

The transceivers $1^{42}{}_{1-X}$ and medium dependent interfaces $1^{43}{}_{1-X}$ shown in FIG. 5, like the ones depicted in FIG. 1, as well as a repeater unit 141, all conform to the IEEE 802.3u Standard. The repeater unit 141, transceivers $142_{1-X}$, and medium dependent interfaces $143_{1-X}$ may all be coupled together in the same manner as described in FIG. 1, with the additions set forth below in this Detailed Description.

The repeater unit 141 is coupled to receive the DATA signal, ECLK signal, EACT signal, ECOL signal, and DONE signal from the expansion port 145. The repeater unit 141 is also coupled to provide a ONEACTIVE signal and MULTIACTIVE signal to the expansion port 145.

The ECOL signal is asserted when the expansion port 145 has detected the presence of a collision in the logical repeater set 160. The EACT signal is asserted by the expansion port when non-collision activity is present on the expansion bus 161. The DONE signal is asserted by the expansion port 145 to indicate that the expansion port 145 has completed a transmission of data on the DATA signal in response to a reception or collision.

The GCOL signal is asserted to indicate that the repeater unit 141 has detected a collision condition in the logical repeater 160. The ONEACTIVE signal indicates that only one of the ports in the repeater set 140 is receiving data. The MULTIACTIVE signal indicates that more than one of the ports in the repeater set 140 are receiving data.

The delay generator circuit 144 is coupled to receive the MINSYM signal, a MINSCLK signal, the set of $OUTSYM_{1-2}$ signals, a set of $PTXC_{1-2}$ signals and the GCOL signal from the repeater unit 141. The delay generator circuit 144 provides the DINSYM signal to the expansion port 145 and the set of $DOUTSYM_{1-X}$ signals to the repeater unit 144. The MINSCLK signal is a reference clock for the data on the MINSYM signal. The MINSCLK signal is also provided to the expansion port 145 to serve as a reference clock for the data in the DINSYM signal. Each of the $PTXC_{1-2}$ signals serves as a reference clock for a respective one of the $OUTSYM_{1-2}$ signals.

A user interface bus 146, including data, address, and control signals, is also coupled to the delay generator circuit 144. The user interface bus 146 enables a user of the repeater set 140 to program the delay generator circuit 144 with values that will be described in greater detail below. One with ordinary skill in the art will recognize that the user interface bus 146 may be implemented by employing a traditional bus for enabling the loading of data storage elements, such as memory or registers, within the delay generator circuit 144.

2. Repeater Unit

Figure 6A:
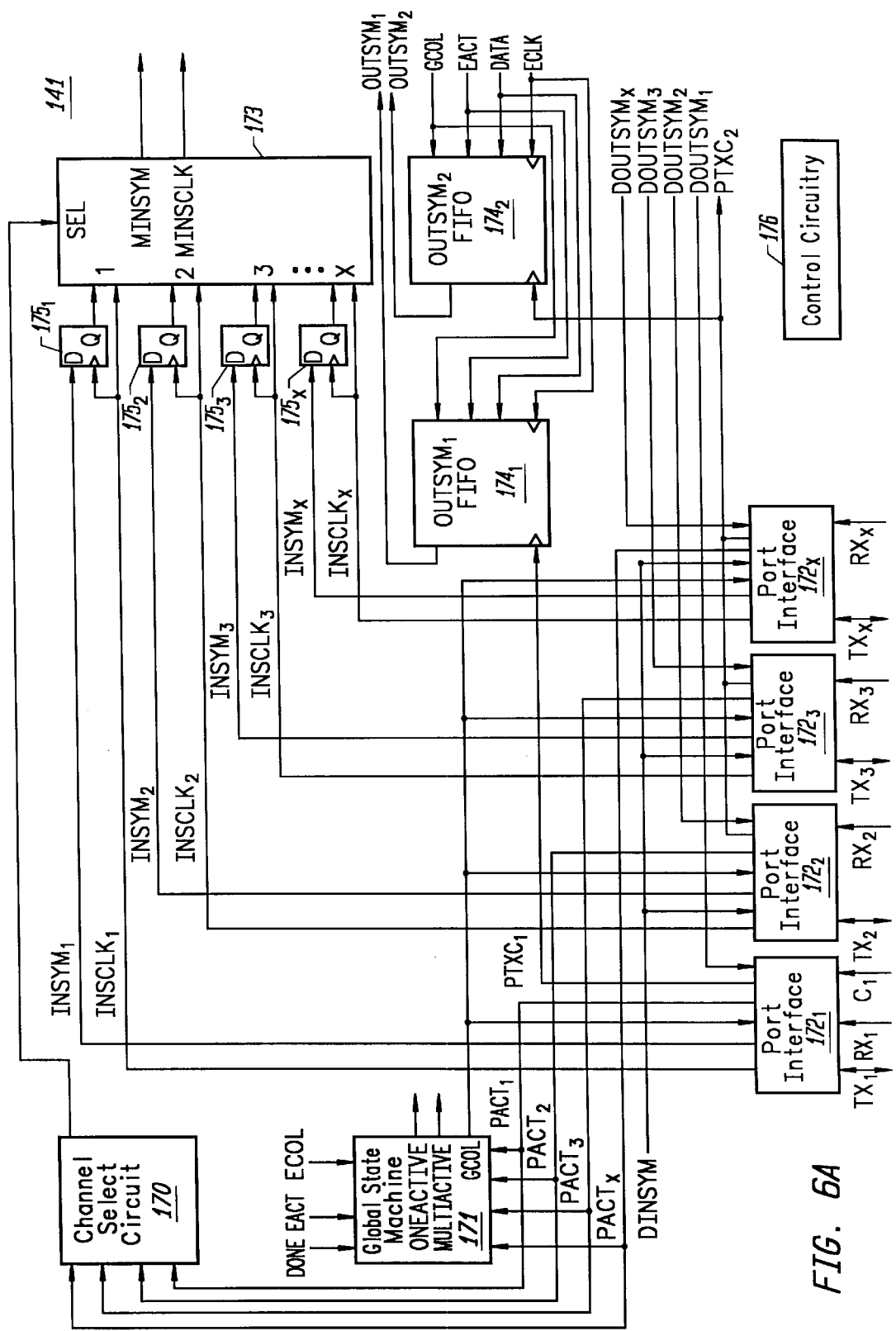
FIG. 6A illustrates circuitry employed in the repeater unit shown in FIG. 5.
Figure 6B:
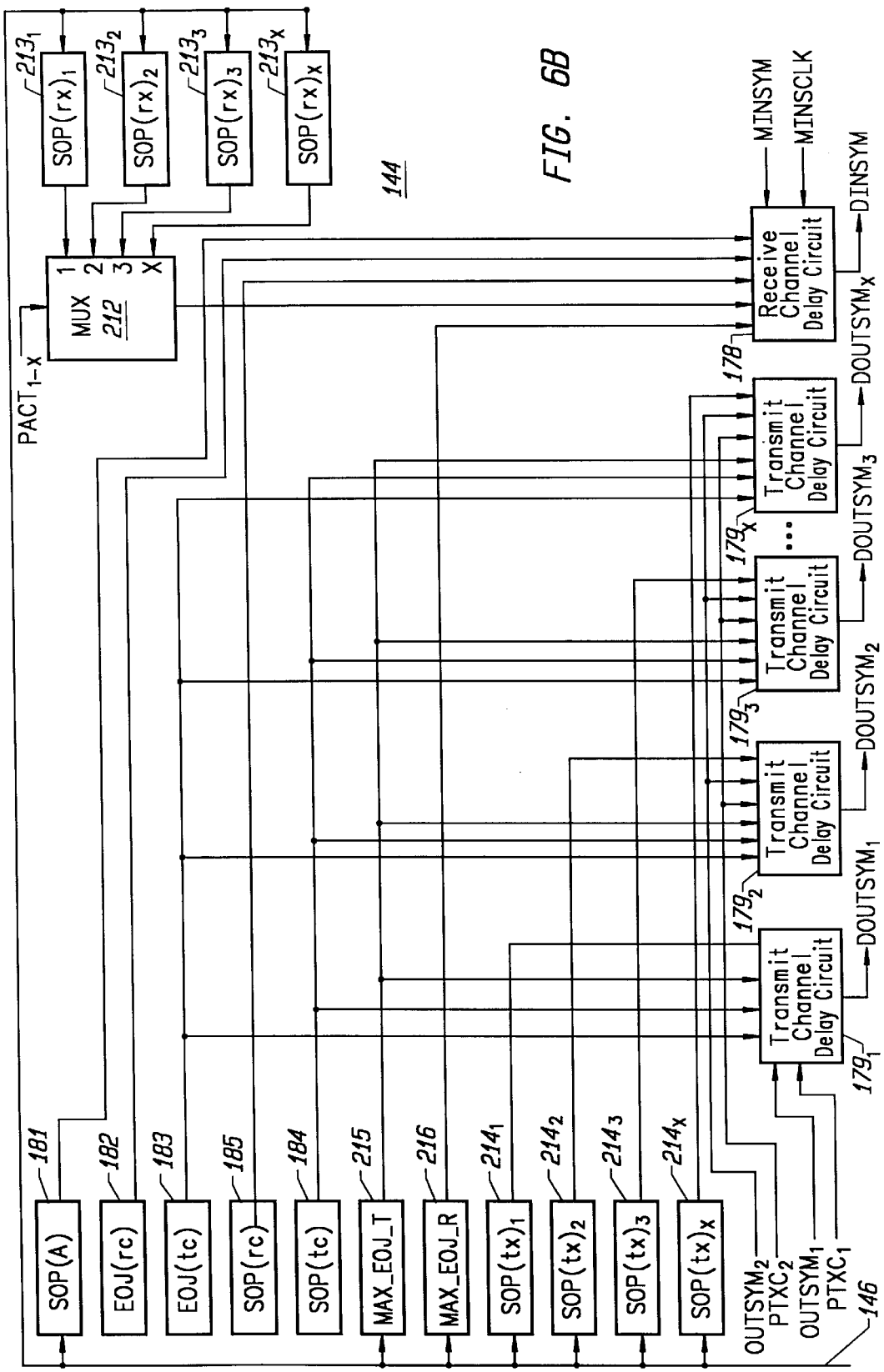
FIG. 6B illustrates one embodiment of the delay generator circuit for the repeater set shown in FIG. 5.
Figure 6C:
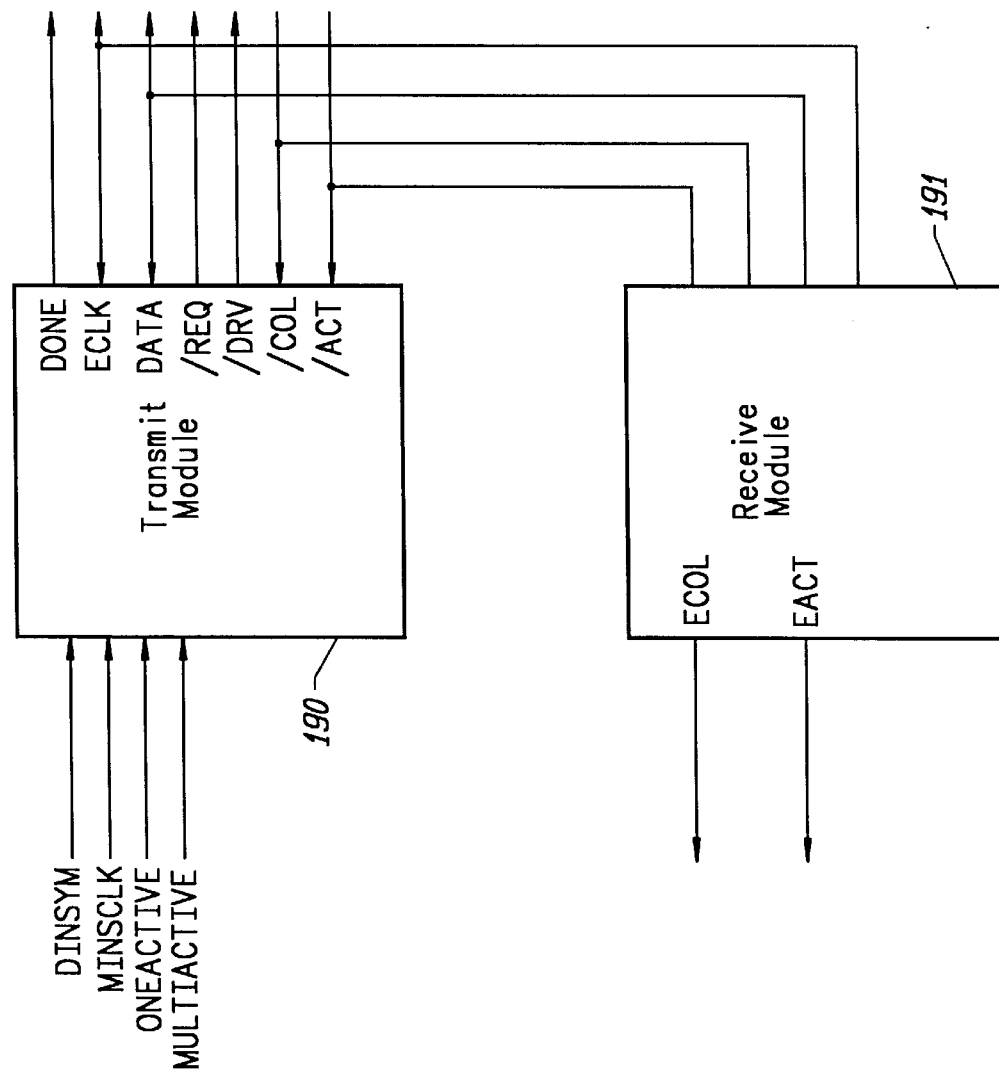
FIG. 6C illustrates a block diagram of the expansion port for the repeater set shown in FIG. 5.

FIGS. 6A–6C provide a detailed illustration of the repeater unit 141, delay generator circuit 144, and expansion port 145. FIG. 6A illustrates the repeater unit 141, which includes a set of port interfaces $172_{1-X}$, a port multiplexer 173, a set of synchronizing first-in-first-out ("FIFO") memories $174_{1-2}$, and logic to support the control of these circuits.

In accordance with the present invention, a transceiver 142 may have a receive channel RX, a set of control signals C, and a transmit channel TX coupled to the repeater unit 141. In one embodiment of the present invention, the receive channel, control signals and transmit channel may be coupled to the repeater unit 141 in conformance with the MII specified in the IEEE 802.3u Standard. An MII receive channel RX includes the following signals:

Receive Clock ("RX_CLK"): A continuous clock provided by the transceiver that provides the timing reference for RX_DV, RXD, and RX_ER;

Receive Data ("RXD<3:0>"): A set of four bits sourced by the transceiver to the repeater unit 141 synchronously with respect to RX_CLK to reflect data received on the transceiver's MDI; and Receive Error ("RX_ER"): A signal provided by the transceiver that is asserted to indicate that an error was detected in the frame being transferred on the receive channel.

A set of MII control signals C includes the following signals:

Receive Data Valid ("RX_DV"): A signal sourced by the transceiver to the repeater unit 141 synchronously with respect to RX_CLK to indicate that valid data is being sourced on RXD<3:0>;

Carrier Sense ("CRS"): A signal asserted by the transceiver when the physical medium attached to the transceiver is not idle. CRS may be asserted when the transceiver is either receiving data or transmitting data; and Collision ("COL"): A signal that is asserted by the transceiver 142 upon detecting that a collision has occurred, such as when the transmit channel and receive channel are both active.

A MII transmit channel TX includes the following signals:

Transmit Clock ("TX_CLK"): A continuous clock sourced by the transceiver to the repeater unit 141 that provides a timing reference for the TX_EN, TXD, and TX_ER signals;

Transmit Data ("TXD<3:0>"): A set of four data bits sourced by the repeater unit 141 synchronously with respect to TX_CLK. The data on TXD<3:0> is transmitted onto the transceiver's MDI when TX_EN is asserted and ignored by the transceiver when TX_EN is deasserted;

Transmit Enable ("TX_EN"): A signal sourced by the repeater unit 141 synchronously with respect to TX_CLK to indicate that data is being provided on the TXD; and Transmit Coding Error ("TX_ER"): A signal asserted by the repeater unit 141 to instruct the transceiver to transmit a character within the data frame on the transceiver's transit channel that is not part of the data being provided on the transmit channel.

Alternatively, a transceiver may include only a receive channel RX and a transmit channel TX that are coupled to the repeater unit 141. The control information is encoded into the data provided by the transceiver 142 on the receive channel and the data provided by the repeater unit 141 on the transmit channel. In such an embodiment, the receive channel RX may only include a set of receive data signals ("RXD") and a receive clock ("RX_CLK"). Similarly, the transmit channel TX may only include a set of transmit data signals ("TXD") and a transmit clock ("TX_CLK")

In one embodiment of the present invention, transceiver $142_1$ is coupled to the repeater unit 141 in accordance with the MII specified in the IEEE 802.3u Standard. Transceivers $142_2$, $142_3$ and $142_X$ are coupled to the repeater unit 141 in accordance with the alternate receive channel and transmit channel described above. In alternate embodiments of the present invention, the ports may conform to yet another interface including receive channels and transmit channels. Each type of port channel interfaces may appear on none, all or any different combination of the repeater set's ports.

As shown in FIG. 6A, the repeater unit 141 includes a set of port interfaces $172_{1-X}$. Each port interface provides an interface to the transmit channel, receive channel, and control signals, if any, of a respective one of the transceivers $142_{1-X}$.

Figure 7:
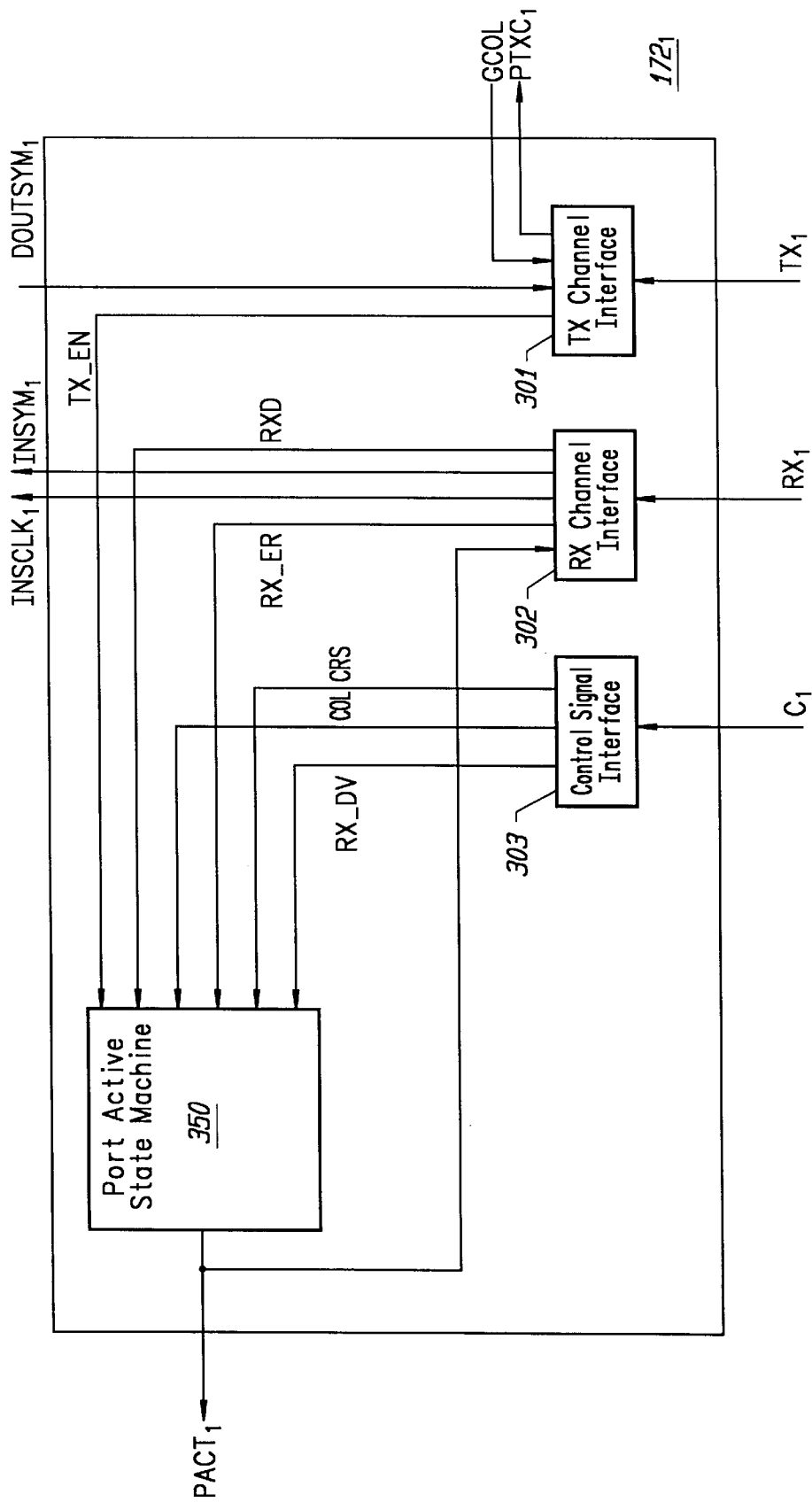
FIG. 7 illustrates a port interface in the repeater set shown in FIG. 5 for interfacing to an MII port.

FIG. 7 illustrates a port interface $172_1$ that is employed when the port has an MII interface. Port interface $172_1$ includes a MII transmit channel interface 301, MII receive channel interface 302, and MII control signal interface 303. The MII transmit interface 301 is coupled to the MII transmit channel $TX_1$; the MII receive channel interface 302 is coupled to the MII receive channel $RX_1$, and the MII control signal interface 303 is coupled to the MII control signals $C_1$.

The MII receive channel interface 302 is also coupled to receive the output of a port active state machine 350 (described in greater detail below) to determine when the receive channel is active. The receive channel interface 302 converts the signals that are received on the MII receive channel $RX_1$ into an internal set of receive data signals, which is labeled as $INSYM_1$. A clock signal $INSCLK_1$ is also provided by the MII receive channel interface 302 to serve as a timing reference for the $INSYM_1$ signal.

In accordance with the present invention, the MII receive channel signals may be encoded to form a five bit INSYM<4:0> signal. Table I below illustrates an encoding scheme that may be employed.

TABLE I

| | INSYM ENCODING | | |
|---|---|---|---|
| ENTRY | INSYM | MII RXD | DESCRIPTION |
| 1 | 11110 | 0000 | Data 0 |
| 2 | 01001 | 0001 | Data 1 |
| 3 | 10100 | 0010 | Data 2 |
| 4 | 10101 | 0011 | Data 3 |
| 5 | 01010 | 0100 | Data 4 |
| 6 | 01011 | 0101 | Data 5 |
| 7 | 01110 | 0110 | Data 6 |
| 8 | 01111 | 0111 | Data 7 |
| 9 | 10010 | 1000 | Data 8 |
| 10 | 10011 | 1001 | Data 9 |
| 11 | 10110 | 1010 | Data A |
| 12 | 10111 | 1011 | Data B |
| 13 | 11010 | 1100 | Data C |
| 14 | 11011 | 1101 | Data D |
| 15 | 11100 | 1110 | Data E |
| 16 | 11101 | 1111 | Data F |
| 17 | 11111 | Undefined | Idle |

The INSYM column indicates the value to be placed on the INSYM set of signals. The MII RXD column indicates the value on the set of MII receive data signals RXD<3:0> for the corresponding INSYM value. The Description column indicates the interpretation of the INSYM signal.

For example, in the first table entry, INSYM is 11110, and the RXD value is 0000. The Description indicates that INSYM is interpreted by the repeater set 140 to indicate that a data value of zero is being provided on the MII's RXD signals. The first sixteen entries in Table I address the proper encoding of data values provided on the MII's receive data signals, once it is detected that the MII port is active. An assertion of the port active state machine's output PACT, indicates that the MII port's receive channel RX is active.

Entry 17 in Table I indicates that INSYM is set to a value of 11111 when the MII receive channel is not active, thereby indicating that the MII receive channel is idle. Other values of INSYM<4:0> than those listed in Table I may be employed to indicate different occurrences on the receive channel.

The transmit channel interface 301 converts an internal data signal $DOUTSYM_1$ into a set of MII transmit channel signals. In accordance with the present invention, DOUTSYM$_1$ may be a 5 bit signal DOUTSYM<4:0>. Table II illustrates an encoding scheme that may be employed by the transmit channel interface 301.

TABLE II

| | DOUTSYM DECODING | | |
|---|---|---|---|
| ENTRY | DOUTSYM | MII TXD | DESCRIPTION |
| 1 | 11110 | 0000 | Data 0 |
| 2 | 01001 | 0001 | Data 1 |
| 3 | 10100 | 0010 | Data 2 |
| 4 | 10101 | 0011 | Data 3 |
| 5 | 01010 | 0100 | Data 4 |
| 6 | 01011 | 0101 | Data 5 |
| 7 | 01110 | 0110 | Data 6 |
| 8 | 01111 | 0111 | Data 7 |
| 9 | 10010 | 1000 | Data 8 |
| 10 | 10011 | 1001 | Data 9 |
| 11 | 10110 | 1010 | Data A |
| 12 | 10111 | 1011 | Data B |
| 13 | 11010 | 1100 | Data C |

TABLE II-continued

DOUTSYM DECODING

| ENTRY | DOUTSYM | MII TXD | DESCRIPTION |
|---|---|---|---|
| 14 | 11011 | 1101 | Data D |
| 15 | 11100 | 1110 | Data E |
| 16 | 11101 | 1111 | Data F |
| 17 | 11111 | undefined | Idle |
| 18 | 11000 | 0101 | Start-of-Stream Delimiter, Part 1 of 2. |
| 19 | 10001 | 0101 | Start-of-Stream Delimiter, Part 2 of 2. |
| 20 | 01101 | undefined | End-of-Stream Delimiter, Part 1 of 2. |
| 21 | 00111 | undefined | End-of-Stream Delimiter, Part 2 of 2. |
| 22 | 00100 | undefined | Transmit Error |

The DOUTSYM column indicates the value to be placed on each bit in the DOUTSYM signal. The MII TXD column indicates the value of the MII transmit data TXD for a corresponding DOUTSYM value. The Description column indicates the interpretation of the DOUTSYM signal.

For example, in the first table entry DOUTSYM is 11110, and the TXD value is 0000. The Description indicates that the DOUTSYM is interpreted by the repeater set 140 to indicate that a data value of zero is to be provided on the MII's TXD signals. The first sixteen entries in Table II address the proper decoding of data values to be provided on the MII's transmit data signals during a transmission. In the case of any one of these 16 entries, the MII transmit enable TX_EN is asserted by the transmit channel interface 301.

Entry 17 in Table II indicates that the DOUTSYM signal is set to a value of 11111 when the MII transmit data signals are not to be provided with data from the repeater unit 141, thereby indicating that the MII transmit channel is to be idle. When the transmit channel is IDLE, MII transmit enable TX_EN is deasserted. Entries 18 and 19 in Table II show values of DOUTSYM, which upon being sequentially transmitted, indicate that a data frame is to begin being provided to the transmit channel. Accordingly, the value 0101 is provided to the MII transmit data signals TXD and the MII transmit enable TX_EN is asserted, until an end of the frame is indicated.

Entries 20 and 21 indicate values of DOUTSYM that signal the end of a data frame upon being provided to the transmit channel interface 301 sequentially. In response, the MII transmit enable signal is deasserted. Entry 22 in Table II shows that when DOUTSYM equals 00100 a transmit error condition is to be communicated to the MII transmit channel. Accordingly, the transmit interface 301 asserts the MII transmit error signal.

The transmit channel interface 301 also provides a port transmit clock signal ("PTXC$_1$"), which serves as a timing reference for the generation and reception of the DOUTSYM$_{1-X}$ signal. The PTXC$_1$ signal is derived from the transmit clock TX_CLK signal provided on the transmit channel TX$_1$. The period of the PTXC$_1$ clock may be equal to the time period of a data character or the TX_CLK signal.

As stated above, each port interface 172 for an MII also includes a port active state machine 350 for determining when a port in the repeater set 140 is providing data to the repeater unit 141. The port active state machine 350 receives the TX_EN signal from the transmit channel interface 301, the RX_ER and RXD signals from the receive channel interface 302, and the COL, CRS and RX_DV signals from the control signal interface 303.

Figure 8:
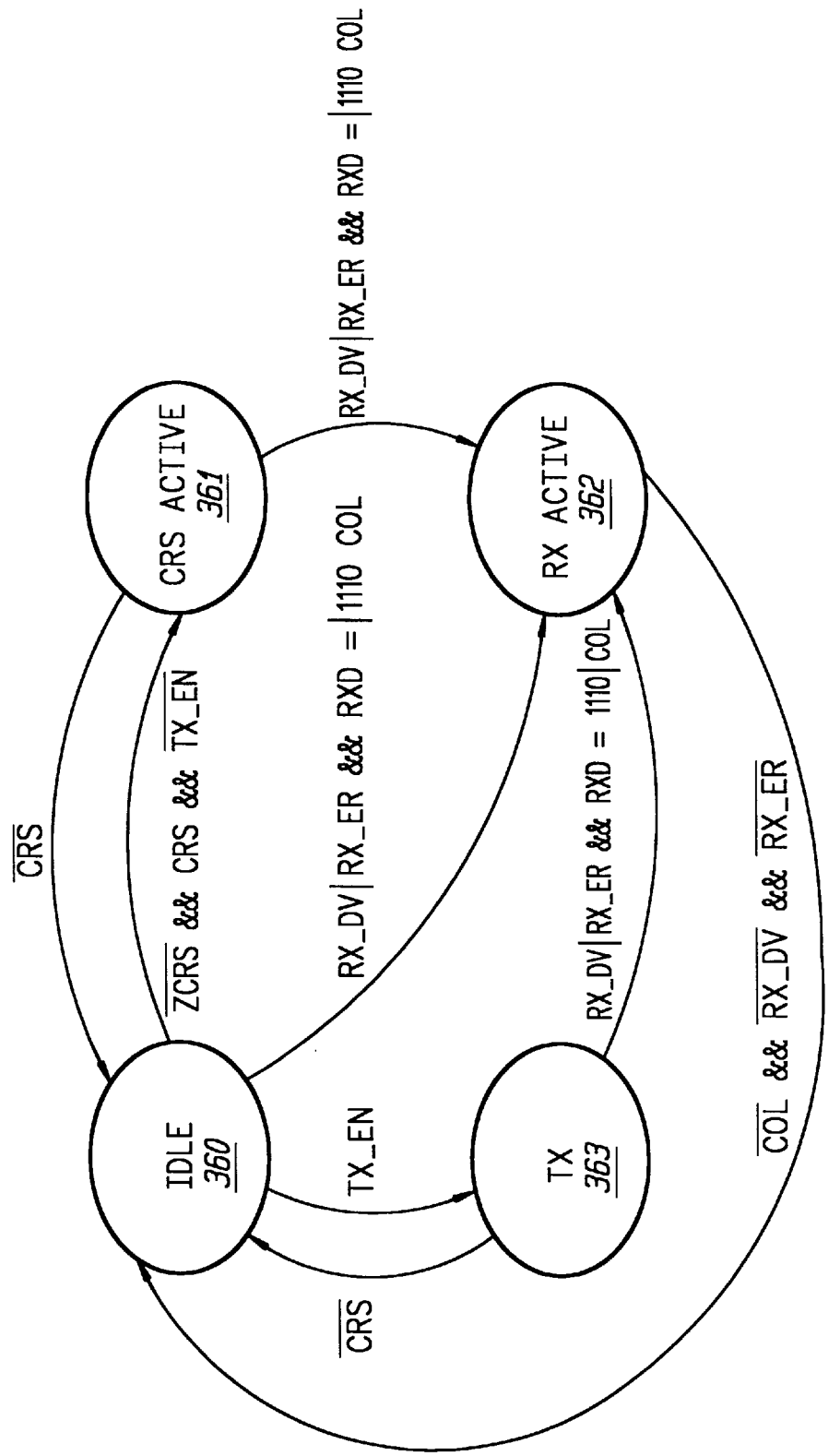
FIG. 8 illustrates a state diagram for the port active state machine in the port interface shown in FIG. 7.

FIG. 8 illustrates one possible state diagram for such a port active state machine 350. The state machine in FIG. 8 may be implemented as an asynchronous state machine or synchronous state machine that transitions synchronously with the port's transmit clock signal TX_CLK, receive clock signal RX_CLK, port transmit clock PTXC$_1$ signal or another clock.

Upon being powered up, the port active state machine 350 transitions to an IDLE state 360. In the IDLE state 360, the output PACT of the port state machine 350 is deasserted to indicate that the MII receive channel is not active. The output of each port state machine 350 in the repeater unit 141 is coupled to the delay generator circuit 144, a port multiplexer channel select circuit 170 (FIG. 6A), and a global state machine 171 (FIG. 6A).

The state machine 350 transitions from the IDLE state 360 to a CRS ACTIVE state 361 when the carrier sense signal CRS is asserted, and was deasserted in the previous state machine clock period (/ZCRS), and the transmit enable signal TX_EN on the MII port is not asserted. In the CRS ACTIVE state 361, the state machine 350 output PACT is asserted to indicate that the MII receive channel is active. When the state machine 350 is in the IDLE state 360 and the receive data valid signal RX_DV is asserted or the port's COL signal is asserted or both the RX_ER signal is asserted and RXD=1110, the state machine 350 transitions to a RX ACTIVE state 362. In the RX ACTIVE state 362, the output PACT of the state machine 350 is asserted. When the state machine 350 is in the IDLE state 360 and the transmit enable signal TX_EN for the port is asserted, the state machine 350 transitions to a TX state 363. In the TX state 363, the output of the state machine 350 is deasserted. Otherwise, the state machine 350 remains in the IDLE state 360.

The state machine 350 transitions from the CRS ACTIVE state 361 to the IDLE state 360 when the port's carrier sense signal CRS is deasserted. The state machine 350 transitions from the CRS ACTIVE state 361 to the RX ACTIVE state 362 under the same conditions that the state machine 350 transitions from the IDLE state 360 to the RX ACTIVE state 362. Otherwise, the state machine 350 remains in the CRS ACTIVE state 361.

The state machine 350 transitions from the RX ACTIVE state 362 to the IDLE state 360 when the port's COL signal is deasserted and the port's receive data valid signal RX_DV is deasserted and the port's receive error signal RX_ER is deasserted. Otherwise, the state machine 350 remains in the RX ACTIVE state 362.

The state machine 350 transitions from the TX state 363 to the RX ACTIVE state 362 under the same conditions that the state machine 350 transitions from the IDLE state 360 to the RX ACTIVE state 362. The state machine 350 transition from the TX state 363 to the IDLE state 360 when the port's carrier sense signal CRS is deasserted. Otherwise, the state machine 350 remains in the TX state 363.

Figure 9:
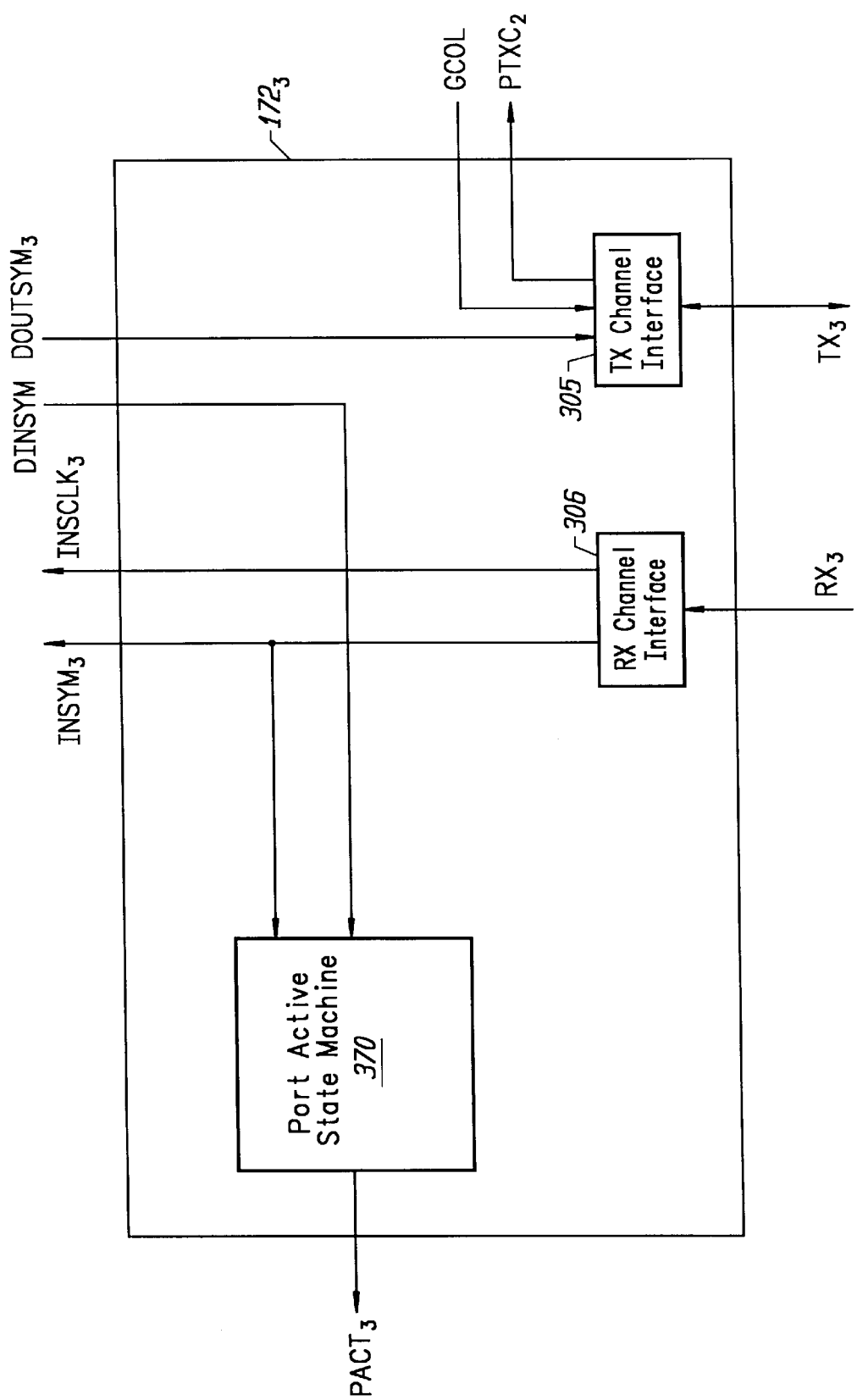
FIG. 9 illustrates a port interface in the repeater set shown in FIG. 5 for interfacing to a non-MII port.

As described above, a repeater port may alternatively include only a set of transmit and receive data signals and a transmit and receive clock. A port interface 172$_3$ to such a port in shown in FIG. 9. The port interface 172$_3$ may include a transmit channel interface 305 and receive channel interface 306, but not a control signal interface. The values received from the port's receive channel RX$_3$ are the INSYM$_3$ values, and the receive channel interface 306 does not have to perform any encoding. The values provided to the transmit channel by the repeater unit 141 are the DOUT- $SYM_3$ values, and the transmit channel interface 305 does not have to perform any decoding.

The transmit channel interface 305 may also receive a transmit clock TX_CLK signal from a transceiver coupled to the transmit channel $TX_3$. The transmit channel interface 305 derives a port transmit clock $PTCX_2$ signal from the TX_CLK. The $PTXC_2$ clock signal may have a period equal to a time period of a data character and have a frequency of 25 Mhz.

Figure 10:
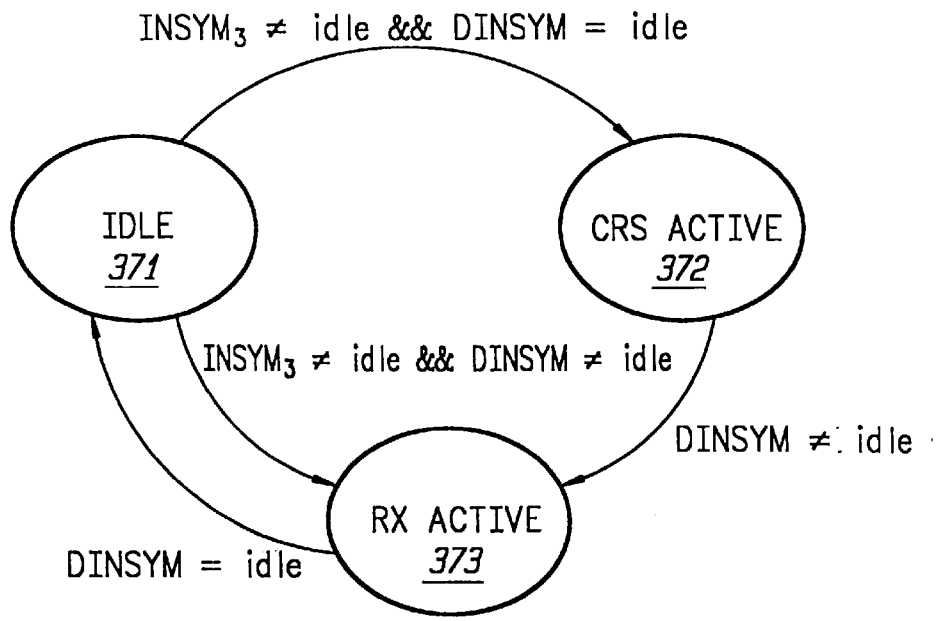
FIG. 10 illustrates a state diagram for the port active state machine in the port interface shown in FIG. 9.

FIG. 10 illustrates a state diagram for a port active state machine 370 to be employed in a port interface $172_3$ that interfaces to a port having a receive channel employing INSYM signals and a transmit channel employing DOUTSYM signals. The state machine 370 receives both the INSYM signal and the DINSYM signal. The state machine 370 asserts its output PACT signal to indicate that the port is receiving data. The state machine 370 maintains the assertion of the PACT signal, until all the data received from the port is transferred to the expansion port 145. The state machine 370 in FIG. 10 may be implemented as an asynchronous state machine or a synchronous state machine that transitions synchronously with the port's transmit clock signal, receive clock signal, $PTXC_2$ signal, or another clock.

Upon being power up, the port active state machine 370 transitions to an IDLE state 371. In the IDLE state 371, the output PACT of the port state machine 370 is deasserted to indicate that the port's receive channel is not active. The output of the port state machine 370 is coupled to the delay generator circuit 144, the port multiplexer channel select circuit 170 (FIG. 6A), and the global state machine 171 (FIG. 6A).

The state machine 370 transitions from the IDLE state 371 to a CRS ACTIVE state 372 when the $INSYM_3$ signal indicates that the receive channel $RX_3$ is not idle and the DINSYM signal indicates an idle condition. In the CRS ACTIVE state 372, the state machine 370 output PACT is asserted to indicate that the receive channel is active. When the state machine 370 is in the IDLE state 371 and the $INSYM_3$ signal indicates that the receive channel is not idle and the DINSYM signal does not indicate an idle condition, the state machine 350 transitions to a RX ACTIVE state 373. In the RX ACTIVE state 373, the output PACT of the state machine 370 is asserted. Otherwise, the state machine 370 remains in the IDLE state 371.

The state machine 370 transitions from the CRS ACTIVE state 372 to the RX ACTIVE state 373 when the DINSYM signal does not indicate an idle condition. Otherwise, the state machine 370 remains in the CRS ACTIVE state 372. The state machine 370 transitions from the RX ACTIVE state 373 to the IDLE state 371 when the DINSYM signal indicates an idle condition. Otherwise, the state machine 370 remains in the RX ACTIVE state 373.

The global state machine 171 in the repeater unit 141 asserts the GCOL signal when more than one port in the logical repeater set 160 is determined to be providing data to the logical repeater set 160. The GCOL signal remains asserted until each port in the logical repeater set 160 is idle. The GCOL signal is provided to the transmit channel interface 301, 305 in each port interface $172_{1-X}$.

In response to the GCOL signal being asserted, each port interface $172_{1-X}$ immediately causes a JAM message to be transmitted to a respective one of the transmit channels $TX_{1-X}$. In each port interface $172_{1-X}$, the transmit channel interface 301, 305 ceases to drive its respective transmit channel in response to DOUTSYM and begins providing the JAM message to the transmit channel.

In the repeater unit 141 in FIG. 6A, each INSYM set of signals $INSYM_{1-X}$ and corresponding INSCLK signal is coupled to a respective set of inputs of a port multiplexer 173. Each INSYM set of signals $INSYM_{1-X}$ is coupled to the port multiplexer through a respective register $175_{1-X}$. Each register $175_{1-X}$ has a data input coupled to a set of INSYM signals and a clock input coupled to a corresponding INSCLK signal. The output of each register $175_{1-X}$ is coupled to a respective input of the port multiplexer 173. The registers $175_{1-X}$ are employed to delay the INSYM signals, while the correct channel of the port multiplexer 173 is selected.

The output $PACT_{1-X}$ of each port active state machine is provided to the channel select circuit 170, which has an output coupled to the select input of the port multiplexer 173. The channel select circuit 170 encodes the $PACT_{1-X}$ signals to provide a select signal to the port multiplexer 173 indicating which $INSYM_{1-X}$ signal is being provided. As a result, the active $INSYM_{1-X}$ signal and INSCLK signal are provided at the port multiplexer's output. When more than one $PACT_{1-X}$ signal is asserted, the channel select circuit 170 arbitrarily determines which $INSYM_{1-X}$ signal to indicate as being active. The INSYM signal provided at the port multiplexer's output is referred to as MINSYM and the INSCLK signal provided at the output of the port multiplexer 173 is referred to an MINSCLK.

Each FIFO $174_{1-2}$ in the repeater unit 141 provides an internally synchronized version of the DATA signal that is available from the expansion bus 161. The synchronized version of the DATA signals provided at the FIFOs' output is the set of $OUTSYM_{1-2}$ signals, which are provided to the delay generator circuit 144. Each port transmit clock $PTXC_{1-2}$ provided by the port interfaces $172_{1-X}$ is also provided to a respective one of the FIFOs $174_{1-2}$. Each $PTXC_{1-2}$ signal serves as a timing reference for clocking the respective $OUTSYM_{1-2}$ data out of a respective FIFO $174_{1-2}$. Each port transmit clock signal $PTXC_{1-2}$ is also coupled to the delay generator circuit 144 to serve as a timing reference for a respective $OUTSYM_{1-2}$ signal.

In the embodiment of the present invention depicted in FIG. 6A, port interface $172_1$ provides port transmit clock $PTXC_1$ to FIFO $174_1$. Port interface $172_{2-X}$ each provide the same port transmit clock $PTXC_2$, which is coupled to FIFO $174_2$. A single FIFO may be shared by port interface $172_{2-X}$, because the transceivers $142_{2-X}$ coupled to port interfaces $172_{2-X}$ each have the same transmit clock TX_CLK provided on their respective transmit channel $TX_{2-X}$. This may occur when transceivers $142_{2-X}$ are each formed on the same integrated circuit. In alternate embodiment of the present invention, transceivers $142_{2-X}$ may not have the same transmit clock TX_CLK signals. In such a case, each port interface $172_{2-X}$ will need to be coupled to an individual FIFO. Sharing a single FIFO will not be possible.

When the transceivers $142_{2-X}$ are formed on the same integrated circuit as the repeater unit 141, the PTXC signal may be generated by the repeater unit and provided to both the port interfaces $172_{2-X}$ and the transceivers $142_{2-X}$, as well as all other circuitry that receives the PTXC signal. The transceivers $142_{2-X}$ will use the PTXC signal as the transmit clock TX_CLK signal, and the port interfaces $172_{2-X}$ will be relieved of the need to generate the PTXC signal.

The DATA signal is provided to a data input of each FIFO $174_{1-2}$. The ECLK signal is coupled to each FIFO's input clock signal, which serves as a time reference for clocking data into the FIFO $174_{1-2}$. The EACT signal is also provided to each FIFO $174_{1-2}$. When EACT is asserted, each FIFO $174_{1-2}$ is enabled to clock in the DATA signal, because the DATA signal contains valid information that is to be forwarded to the port interfaces $172_{1-X}$. Each FIFO $174_{1-2}$ also receives the GCOL signal from the global state machine 171. When the GCOL signal is asserted, each FIFO $174_{1\text{-}2}$ is reset, since a collision has occurred.

The global state machine 171 is responsible for providing the repeater set 140 with information regarding the port activity of the entire logical repeater set 160. The global state machine 171 receives the $PACT_{1\text{-}X}$, ECOL, DONE, and EACT signals. The global state machine 171 provides the GCOL, ONEACTIVE, and MULTIACTIVE signals. The global state machine also generates an internal signal named NONEACTIVE.

The ONEACTIVE signal is asserted when the ECOL signal is deasserted and only one of the $PACT_{1\text{-}X}$ signals is asserted. The MULTIACTIVE signal is asserted when more than one of the $PACT_{1\text{-}X}$ signals is asserted. The NONEACTIVE signal is asserted when the ECOL signal is deasserted and the EACT signal is deasserted and each of the $PACT_{1\text{-}X}$ signals is deasserted.

Figure 11:
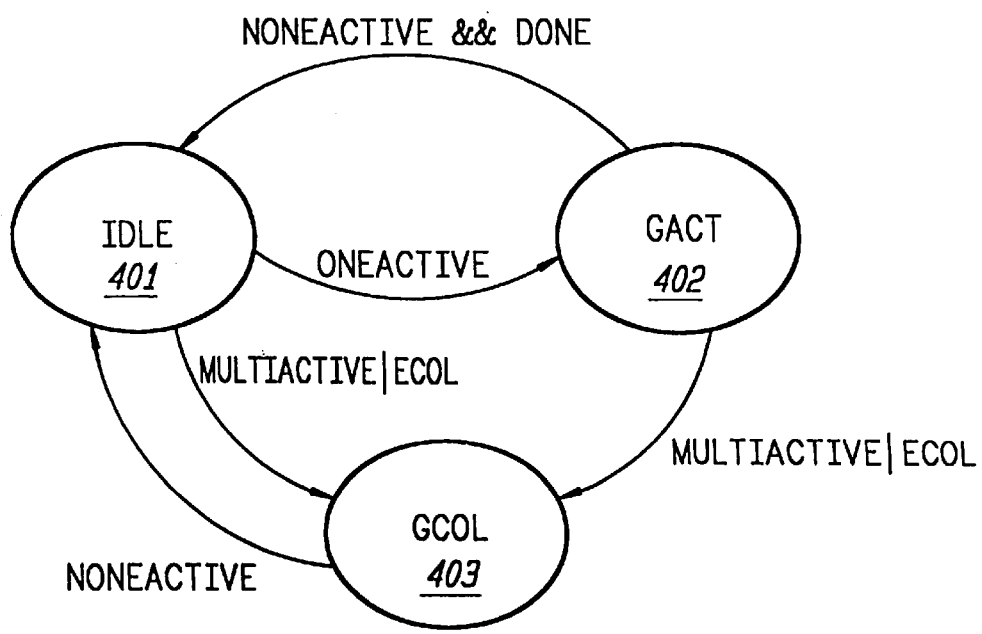
FIG. 11 illustrates a state diagram for the global state machine shown in FIG. 6A.

FIG. 11 illustrates a state diagram of the global state machine 171. The global state machine 171 may be asynchronous or operate synchronously with respect to a clock. Upon being powered up the global state machine 171 enters the IDLE state 401. The global state machine 171 transitions from the IDLE state 401 to a GACT state 402 when the ONEACTIVE signal is asserted. The global state machine 171 transitions from the IDLE state 401 to a GCOL state 403 when the either the MULTIACTIVE signal or ECOL signal are asserted. Otherwise, the global state machine 171 remains in the IDLE state 401.

In the GCOL state 403, the GCOL signal is asserted. Upon exiting the GCOL state, the GCOL signal is deasserted. The global state machine 171 transitions from the GCOL state 403 to the IDLE state when the NONEACTIVE signal is asserted. Otherwise, the global state machine 171 remains in the GCOL state 403.

The global state machine transitions from the GACT state 402 to the GCOL state 403 when either the MULTIACTIVE signal or ECOL signal is asserted. The global state machine 171 transitions from the GACT state 402 to the IDLE state 401 when both the NONEACTIVE signal and DONE signal are asserted. Otherwise, the state machine 402 remains in the GACT state.

The repeater unit 141 also include a block of control circuitry 176. The control circuitry 176 provides for ensuring that the repeater unit 141 performs other operations in conformance with the operational requirements and state diagrams set forth in the IEEE 802.3u Standard. The control circuitry 176 is coupled (not shown) to the other circuitry in the repeater unit 141 to perform its functions.

3. Delay Generator Circuit

FIG. 6B illustrates one embodiment of the delay generator circuit 144. The delay generator circuit 144 includes a transmit channel delay circuit $179_{1\text{-}X}$ for each transmit channel $TX_{1\text{-}X}$ of the repeater unit 141. The delay generator circuit 144 also includes a receive channel delay circuit 178.

The $OUTSYM_{1\text{-}2}$ and $PTXC_{1\text{-}2}$ signals are each provided to a respective transmit channel delay circuit $179_{1\text{-}X}$. Each transmit channel delay circuit $1^{79}{}_{1\text{-}X}$ calculates a transmit channel character delay value for a respective port of the repeater set 140. Each transmit channel delay circuit $1^{79}{}_{1\text{-}X}$ then delays each character in the received OUTSYM signal for the transmit channel character delay value, and provides the delayed OUTSYM signal on an output as a respective one of the $DOUTSYM_{1\text{-}X}$ signals.

The MINSYM and MINSCLK signals are provided to the receive channel delay circuit 178. The receive channel delay circuit 178 calculates a receive channel character delay value for the repeater set 140. The receive channel delay circuit 178 then delays each character in the MINSYM signal for the receive channel character delay value. The delayed MINSYM signal is provided on an output of the receive channel delay circuit 178 as the DINSYM signal.

The delay generator circuit 144 also includes a set of SOP(rx) data storage elements $213_{1\text{-}X}$, a set of SOP(tx) data storage elements $214_{1\text{-}X}$, a MAX_EOJ_R data storage element 216, a MAX_EOJ_T data storage element 215, and a SOP(A) data storage element 181. Each one of these data storage elements has an input coupled to the user interface bus 146 and may be implemented using traditional memory or register circuitry.

Each SOP(rx) data storage element $213_{1\text{-}X}$ may be loaded with a value equal to a SOP(rx) value of a respective transceiver $142_{1\text{-}X}$ in the repeater set 140. Each SOP(rx) data storage element $213_{1\text{-}X}$ has an output coupled to a respective input of a receive port multiplexer 212. An output of the receive port multiplexer 212 is coupled to the receive channel delay circuits 178.

The receive port multiplexer 212 also has a set of select inputs. The receive port multiplexer's select inputs are coupled to the $PACT_{1\text{-}X}$ signals. When an output $PACT_{1\text{-}X}$ of one of the port active state machines is asserted, the output of a corresponding one of the SOP(rx) data storage elements $213_{1\text{-}X}$ is provided on the output of the receive port multiplexer 212.

Each SOP(tx) data storage element $214_{1\text{-}X}$ may be loaded with a value equal to a SOP(tx) value of a respective transceiver $142_{1\text{-}X}$ in the repeater set 140. An output of each SOP(tx) data storage element is coupled to a respective one of the transmit channel delay circuits $179_{1\text{-}X}$.

The MAX_EOJ_R data storage element 216 is loaded with a value equal to or larger than the largest EOJ(rx) value possessed by any of the transceivers in the logical repeater set 160. The MAX_EOJ_T data storage element 215 is loaded with a value equal to or larger than the largest EOJ(tx) value possessed by any of the transceivers in the logical repeater set 160. The SOP(A) data storage element 181 may be loaded with a value equal to an arbiter delay time. The MAX_EOJ_R data storage element 216 and the SOP(A) data storage element 181 each has an output coupled to the receive channel delay circuit 178. The MAX_EOJ_T data storage element 215 has an output coupled to each of the transmit channel delay circuits $179_{1\text{-}X}$.

The delay generator circuit 144 also includes a SOP(rc) data storage element 185, a SOP(tc) data storage element 184, an EOJ(rc) data storage element 182, and an EOJ(tc) data storage element 183. In one embodiment of the present invention, these data storage elements 182, 183, 184, 185 may not be coupled to the user interface bus 146. In an alternate embodiment of the present invention, data storage elements 182, 183, 184 and 185 may be coupled to the user interface bus 146. In either case, data storage elements 182, 183, 184, and 185 may be implemented using traditional memory or register circuits.

The SOP(rc) data storage element 185 is loaded with a value equal to the SOP(rc) for the repeater set 140. The EOJ(rc) data storage element 182 is loaded with a value equal to the EOJ(rc) for the repeater set 140. The SOP(tc) data storage element 184 is loaded with a value equal to the SOP(tc) for the repeater set 140. The EOJ(tc) data storage element 183 is loaded with a value equal to the EOJ(tc) for the repeater set 140. The SOP(rc) data storage element 185 and EOJ(rc) data storage element 182 each have an output coupled to the receive channel delay circuit 178. The SOP (tc) data storage element 184 and EOJ(tc) data storage element 183 each has an output coupled to each of the transmit channel delay circuits 179$_{1-X}$.

4. Expansion Port

FIG. 6C illustrates a block diagram of the expansion port 145, which includes a transmit module 190 and a receive module 191. The transmit module 190 transfers the data on the DINSYM signal onto the expansion bus 161 on the DATA signal. The transmit module 190 provides the DONE, ECLK, /REQ, and /DRV signals and receives and interprets the /COL and /ACT signals. The transmit module also receives the MINSCLK, ONEACTIVE, and MULTI-ACTIVE signals from the repeater unit 141. The receive module 190 determines whether there is activity or collisions occurring on the expansion bus. The receive module 191 receives the /COL, /ACT, ECLK, and DATA signals, while providing the ECOL and EACT signals.

Figure 12:
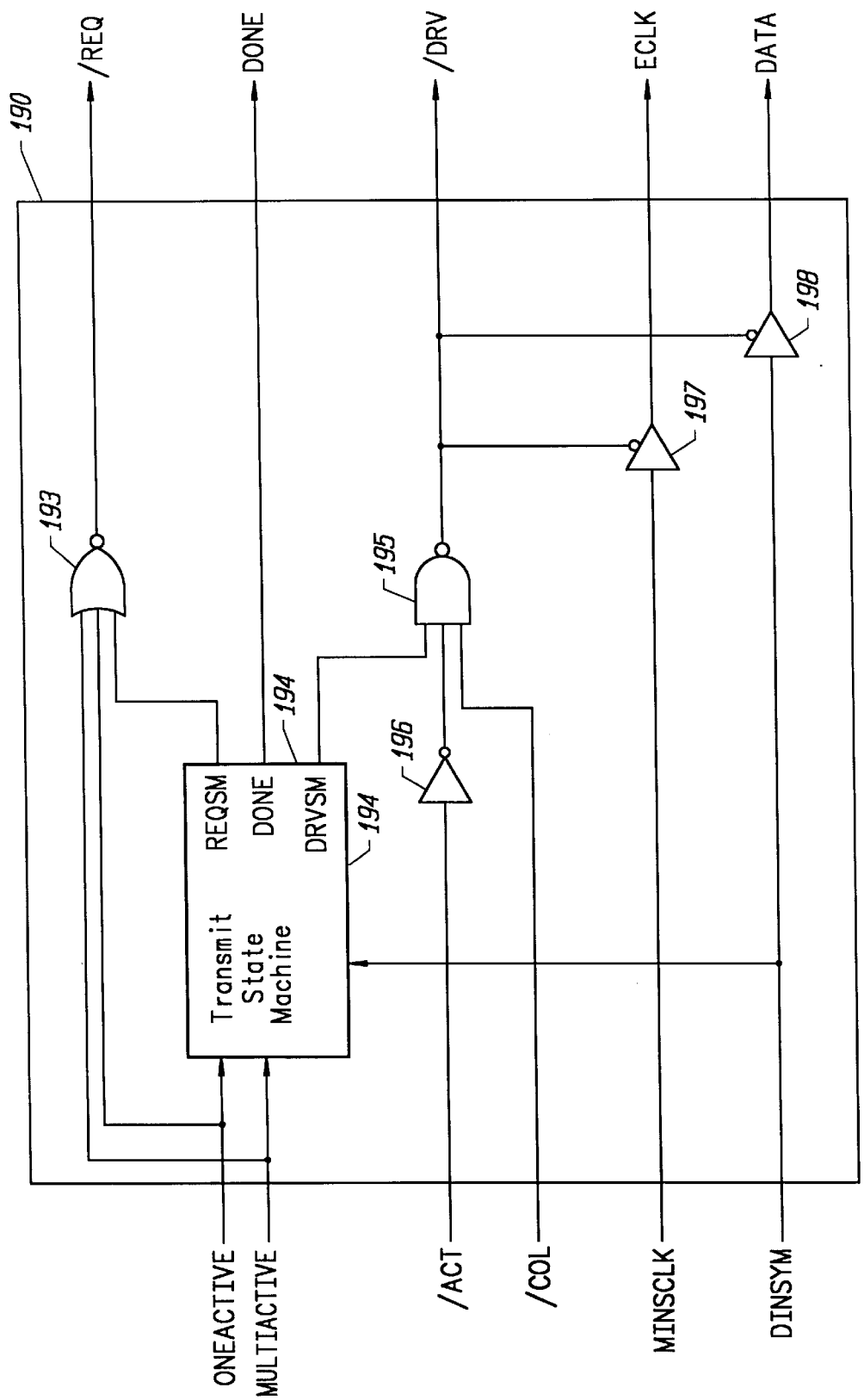
FIG. 12 illustrates circuitry for the expansion port transmit block shown in FIG. 6C.

FIG. 12 illustrates circuitry that may be employed to implement the transmit module 190. A transmit state machine 194 provides a set of signals that provide for the generation of the /REQ, DONE, and /DRV signals. The transmit state machine 194 receives the ONEACTIVE, MULTIACTIVE, and DINSYM signals. The transmit state machine 194 may be either asynchronous or synchronous.

Figure 13:
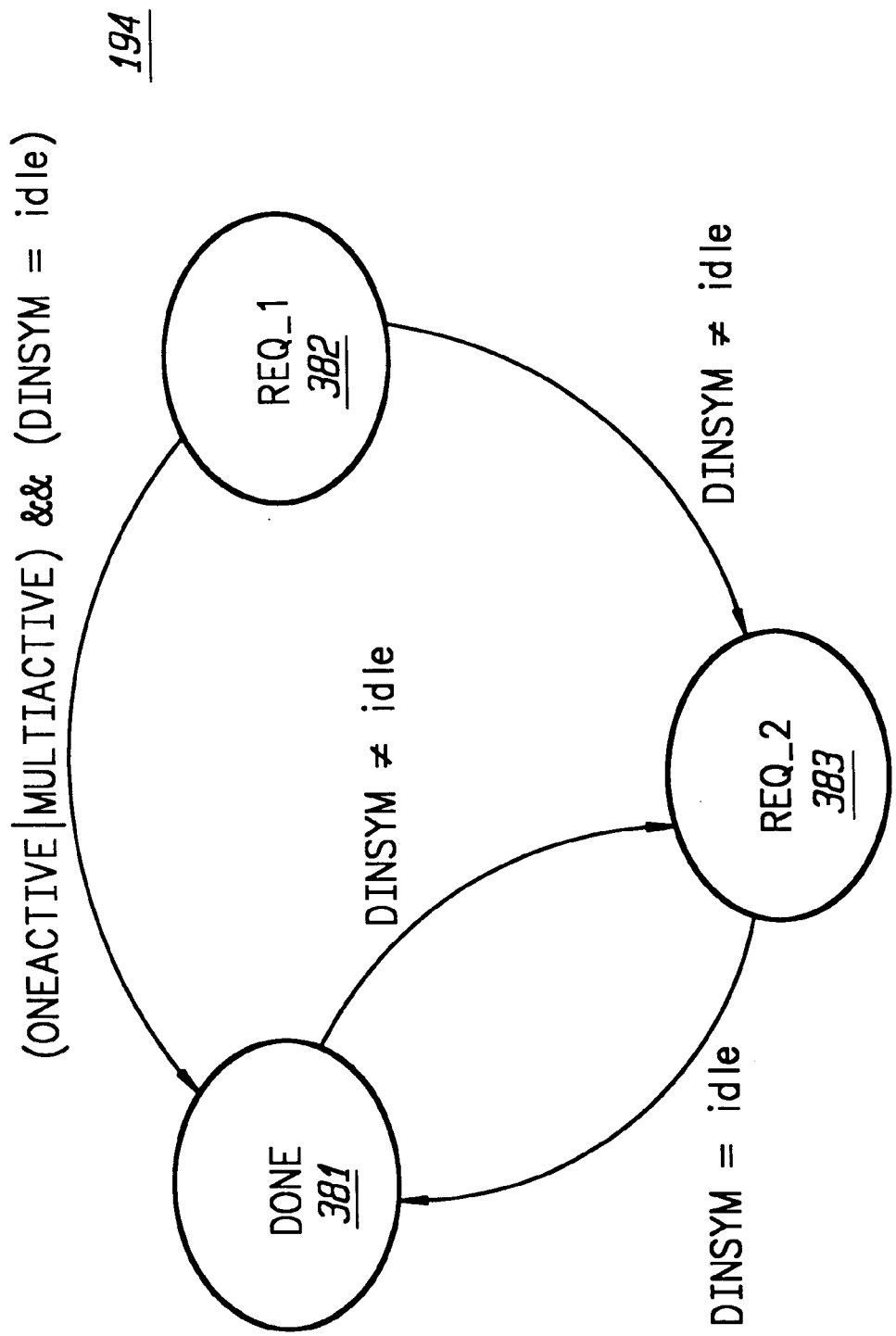
FIG. 13 illustrates a state diagram for the transmit state machine shown in FIG. 12.

FIG. 13 illustrates a state diagram for the transmit state machine 194. Upon being reset, the transmit state machine 194 enters a DONE state 381. In the DONE state, the DONE signal is asserted. The transmit state machine 194 transfers from the DONE state 381 to an REQ_1 state 382 when either the ONEACTIVE signal or MULTIACTIVE signal is asserted and the DINSYM signal has a value that indicates an idle condition. In accordance with Table I, a DINSYM value of 11111 indicates an idle condition. The transmit state machine 194 transitions from the DONE state 381 to a REQ_2 state 383 when the DINSYM signal has a value that does not indicate an idle condition. Otherwise the transmit state machine 194 remains in the DONE state 381. When the transmit state machine transitions out of the DONE state 381, the DONE signal is deasserted.

When the transmit state machine 194 is in the REQ_1 state 382, an REQSM signal is asserted. The assertion of the REQSM signal indicates that a port in the repeater set 140 is receiving data that is not yet available on the DATA signal. The transmit state machine 194 transitions from the REQ_1 state 382 to the REQ_2 state 383 when the DINSYM signal has a value that does not indicate an idle condition. Otherwise the transmit state machine 194 remains in the REQ_1 state 382.

When the transmit state machine 194 is in the REQ_2 state 383, the REQSM signal is asserted and a DRVSM signal is asserted. The transmit state machine 194 transitions from the REQ_2 state 383 to the DONE state 381 when the DINSYM signal has a value indicating an idle condition. Otherwise, the state machine 194 remains in the REQ_2 state 383. Both the REQSM and DRVSM signals are deasserted when the transmit state machine 194 transitions from the REQ_2 state 383 to the DONE state 381.

The /REQ signal is asserted when either the ONEACTIVE signal, the MULTIACTIVE signal or the REQSM signal is asserted. In order to generate the /REQ signal, a three input NOR gate 193 may be employed. On NOR gate 193, a first input is coupled to the ONEACTIVE signal; a second input is coupled to the MULTIACTIVE signal, and a third input is coupled to the REQSM signal. The output of NOR gate 193 provides the /REQ signal.

The /DRV signal is asserted when DRVSM is asserted, /ACT is asserted, and /COL is deasserted. NAND gate 195 may be used to generate the /DRV signal. NAND gate 195 has a first input coupled to the DRVSM signal, a second input coupled to the /ACT signal via inverter 196, and a third input coupled to the /COL signal. The output of NAND gate 195 is the /DRV signal.

The ECLK signal is provided by the output of a tri-state buffer 197 that has its input coupled to the MINSCLK signal. The enable signal of buffer 197 is coupled to the /DRV signal, so that the ECLK signal is driven when the /DRV signal is asserted. The DATA signal is provided by the output of a tri-state buffer 198 that has its input coupled to the DINSYM signal. The enable signal of buffer 198 is coupled to the /DRV signal, so that the DATA signal is driven when the /DRV signal is asserted.

Figure 14:
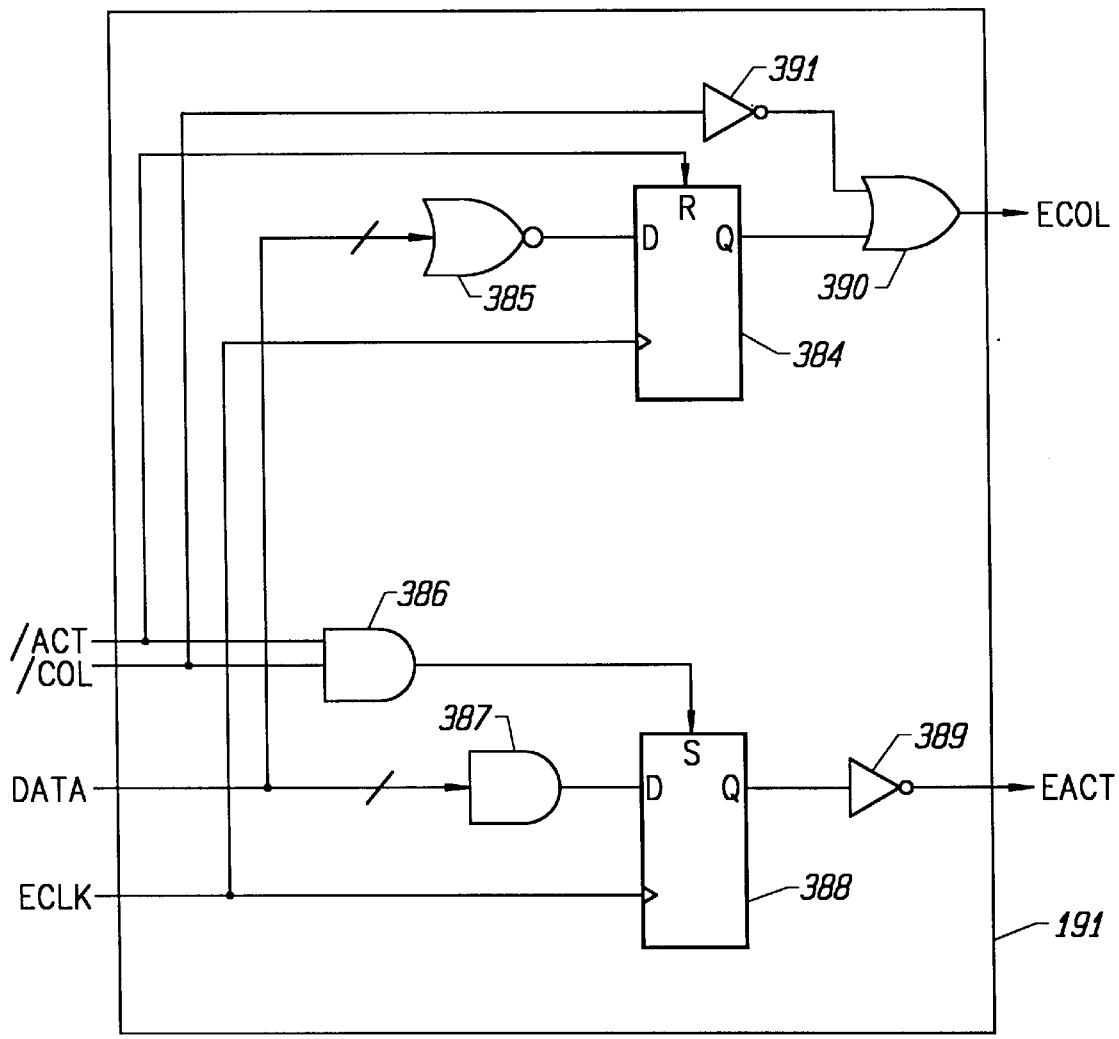
FIG. 14 illustrates circuitry for the expansion port receive block shown in FIG. 6C.

FIG. 14 illustrates circuitry that may be employed in the receive module 191. The ECOL signal is asserted when either the /COL signal is asserted or both the /ACT signal is asserted and the DATA signal has a value indicating a collision condition. A value of 00000 on the DATA signal may be used to represent a collision condition.

In order to generate the ECOL signal, the bits of the DATA signal may be coupled to the inputs of a NOR gate 385. The output of the NOR gate 385 may be coupled to a data input of a D-Q flip flop 384, which has a reset input coupled to the /ACT signal. A clock input of the D-Q flip flop 384 is coupled to the ECLK signal, and an output of the D-Q flip flop 384 is coupled to a first input of an OR gate 390. A second input of the OR gate 390 is coupled to the /COL signal through an inverter 391.

The EACT signal is asserted when non-collision activity is detected on the expansion bus 161. In order to generate the EACT signal, the bits in the DATA signal may be coupled the input of an AND gate 387. The output of the AND gate 387 has an output coupled to a data input of a D-Q flip flop 388. The D-Q flip flop has a set input coupled the output of an AND gate 386 having a first input coupled to the /ACT signal and a second input coupled to the /COL signal. The D-Q flip flop 388 includes a clock input coupled to the ECLK signal and an output coupled to the input of an inverter 389. The output of the inverter 389 provides the EACT signal.

5. Delay Circuits

Figure 15:
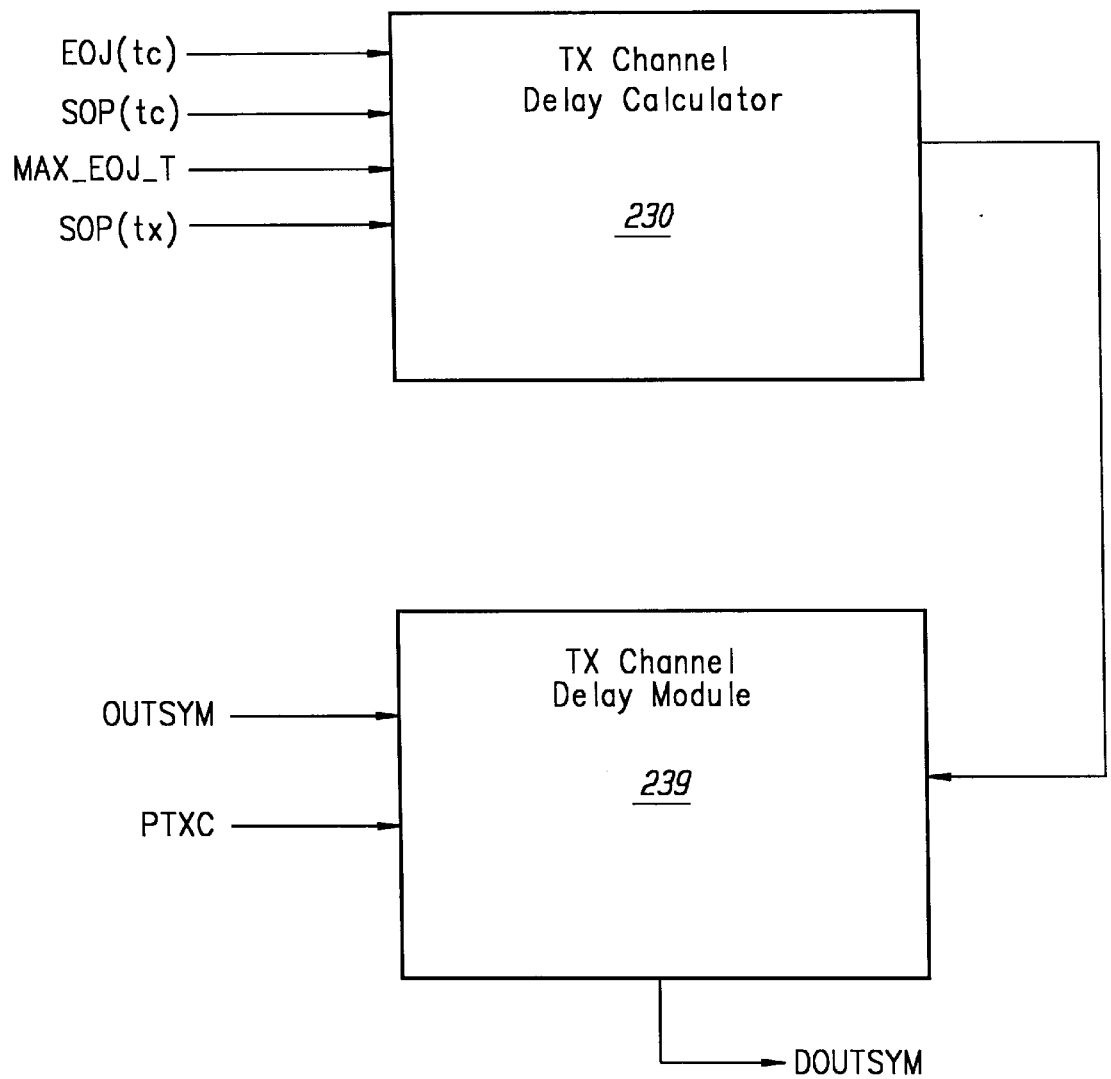
FIG. 15 illustrates a block diagram for one of the transmit channel delay circuits shown in FIG. 6B.

FIG. 15 illustrates a block diagram for one of the transmit channel delay circuits 179$_{1-X}$. The transmit channel delay circuit 179 includes a transmit channel delay module 239 for delaying an OUTSYM signal and a transmit channel delay calculator 230 for calculating a transmit channel character delay value.

Figure 16:
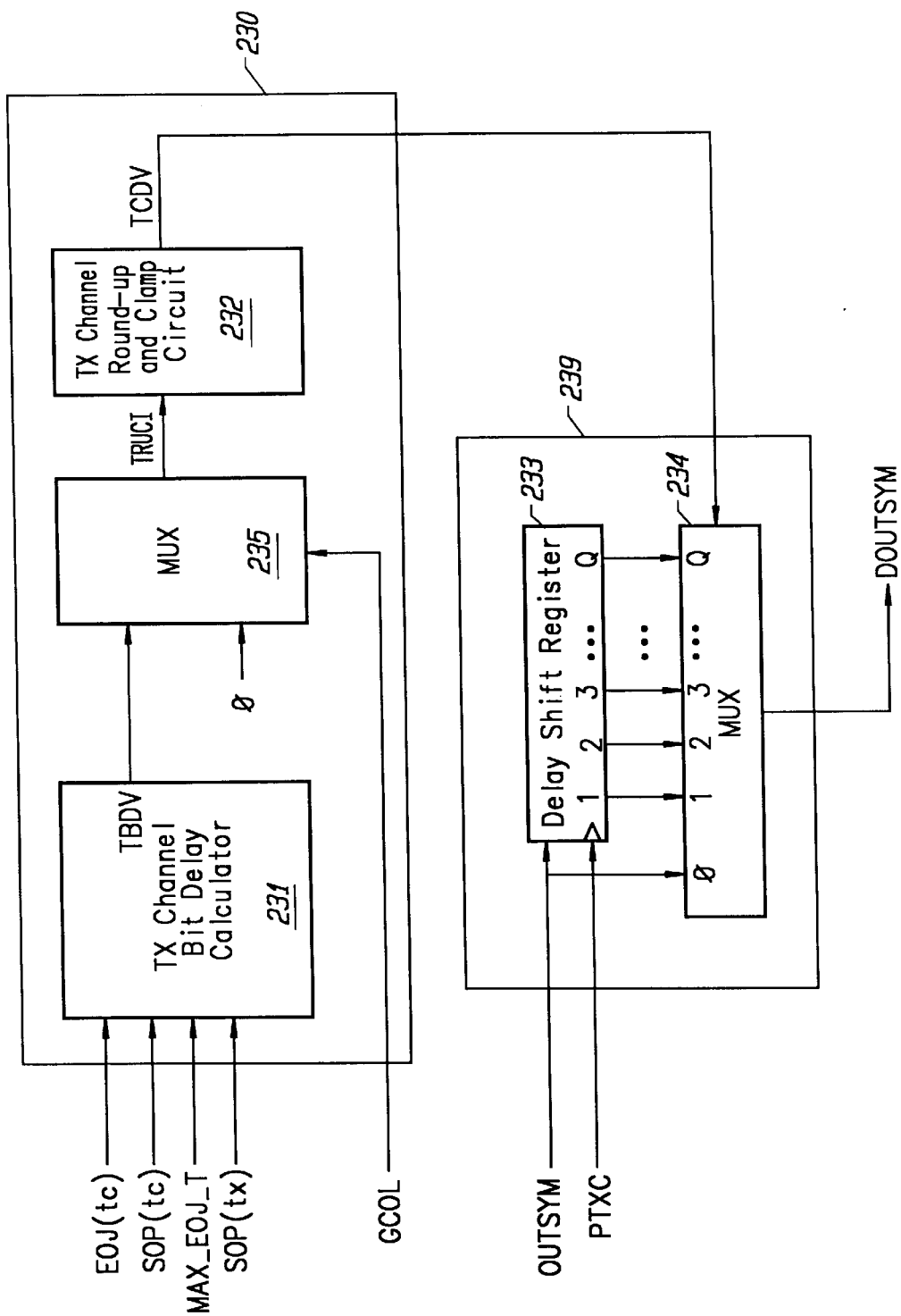
FIG. 16 illustrates circuitry for the transmit channel delay circuit shown in FIG. 15.

FIG. 16 illustrates circuitry that may be employed in each transmit channel delay circuit 179$_{1-X}$. The transmit channel delay module 239 includes a delay shift register 233 having a set of data inputs coupled to receive a respective OUTSYM signal provided by the repeater unit 141. The shift register's data input includes at least as many bits as are included in the OUTSYM signal. In one embodiment of the present invention, OUTSYM includes 5 bits.

The data shift register 233 also includes a clock input for signaling that the data at the input of the shift register 233 should be shifted into the shift register. The shift register's clock input may be coupled to a clock used for shifting OUTSYM signals out of a FIFO memory 174, such as a corresponding one of the PTXC clock signals. In one embodiment of the present invention, the clock has a period equal to a character time.

The shift register 233 is Q number of bits deep and includes Q number of outputs. Each one of the shift register's outputs includes the same number of bits as the input to the delay shift register 233. Each one of the Q number of outputs is coupled to a respective input of a delay multiplexer 234, which is also included in the delay module 239.

The delay multiplexer 234 includes Q+1 inputs. One of these inputs is connected to the input of the delay shift register 233 to receive a real time version of OUTSYM. Each input of the delay multiplexer 234 includes at least as many bits as the input to the shift register 233.

The delay multiplexer 234 includes an output, which forms a respective one of the sets of delayed OUTSYM signals DOUTSYM. The delay multiplexer 234 also includes a select input, which is coupled to an output of the transmit channel delay calculator 230. The output of the delay calculator 230 provides the transmit channel character delay value for the port that is coupled to the transmit channel delay circuit 179. The delay multiplexer 234 selects the input that is indicated by the transmit channel character delay value and provides this input on the delay multiplexer 234 output.

For example, if the transmit channel delay calculator 230 output provides a value of Q, the delay multiplexer 234 selects its Q input, which is coupled to the delay shift register's Q output. As a result, the output of the delay multiplexer 234 provides the DOUTSYM output with an OUTSYM signal that has been delayed in the shift register 233 for a period of Q number of shift register clock cycles.

The transmit channel delay calculator 230 has a set of inputs for receiving the outputs of the following: the output of a respective one of the SOP(tx) data storage elements $214_{1-x}$, the output of the SOP(tc) data storage element 184, the output of the EOJ(tc) data storage element 183, and the output of the MAX_EOJ_T data storage element 215. All of these inputs are then supplied to a transmit channel bit delay calculator 231, which is in the transmit channel delay calculator 230.

The transmit channel bit delay calculator 231 combines these inputs in accordance with Equation 4 to obtain a transmit channel bit delay value. The transmit channel bit delay value in then provided to the input of a collision multiplexer 235, which allows the transmit channel delay to be disabled when a collision condition is detected in the logical repeater set 160.

The collision multiplexer 235 has another input coupled to a predetermined collision value, which may be zero. An output of the collision multiplexer 235 is coupled to an input of a transmit channel roundup and clamp circuit 232. A select signal for the collision multiplexer is coupled the GCOL signal. When GCOL is deasserted the collision multiplexer 235 provides the output of the transmit channel bit delay calculator 231 to the input of the transmit channel round-up and clamp circuit 232 in the delay calculator 230. When GCOL is asserted, the collision multiplexer 235 provides the output of the predetermined collision value to the transmit channel round-up and clamp circuit 232.

In one embodiment of the present invention, the transmit channel round-up and clamp circuit 232 converts the value provided at its input into a transmit character delay value in accordance with Equation 5. The transmit channel character delay value is provided on an output of the transmit channel round-up and clamp circuit 232, which forms the output of the transmit channel delay calculator 230. In an alternate embodiment of the present invention, the transmit channel round-up and clamp circuit 232 converts the transmit channel bit delay value into a transmit channel character delay value in accordance with Equation 6.

The B value used by the transmit channel round-up and clamp circuit 232 is equal to the number of bits used to define a data character in the OUTSYM signal. In the case of an IEEE 802.3u repeater set, B is equal to 4. Although the OUTSYM signal may include 5 bits, this represents a 4 bit character encoded into a 5 bit data and control bit pattern. Further, the Q value may be equal to the number of outputs on the delay shift register 233.

Figure 17:
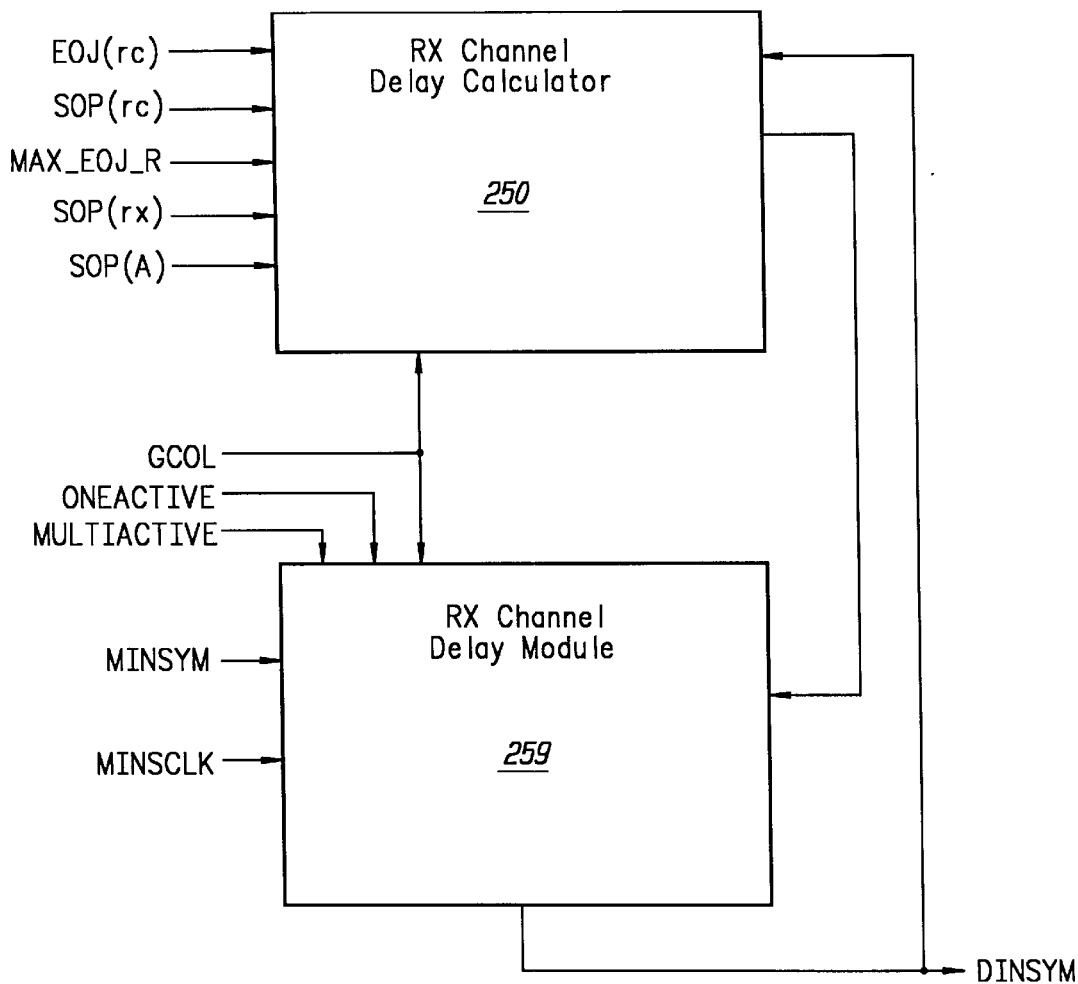
FIG. 17 illustrates a block diagram for the receive channel delay circuit shown in FIG. 6B.

FIG. 17 illustrates a block diagram for the receive channel delay circuit 178. The receive channel delay circuit 178 includes a receive channel delay module 259 for delaying the MINSYM signal and a receive channel delay calculator 250 for calculating a receive channel character delay value.

Figure 18:
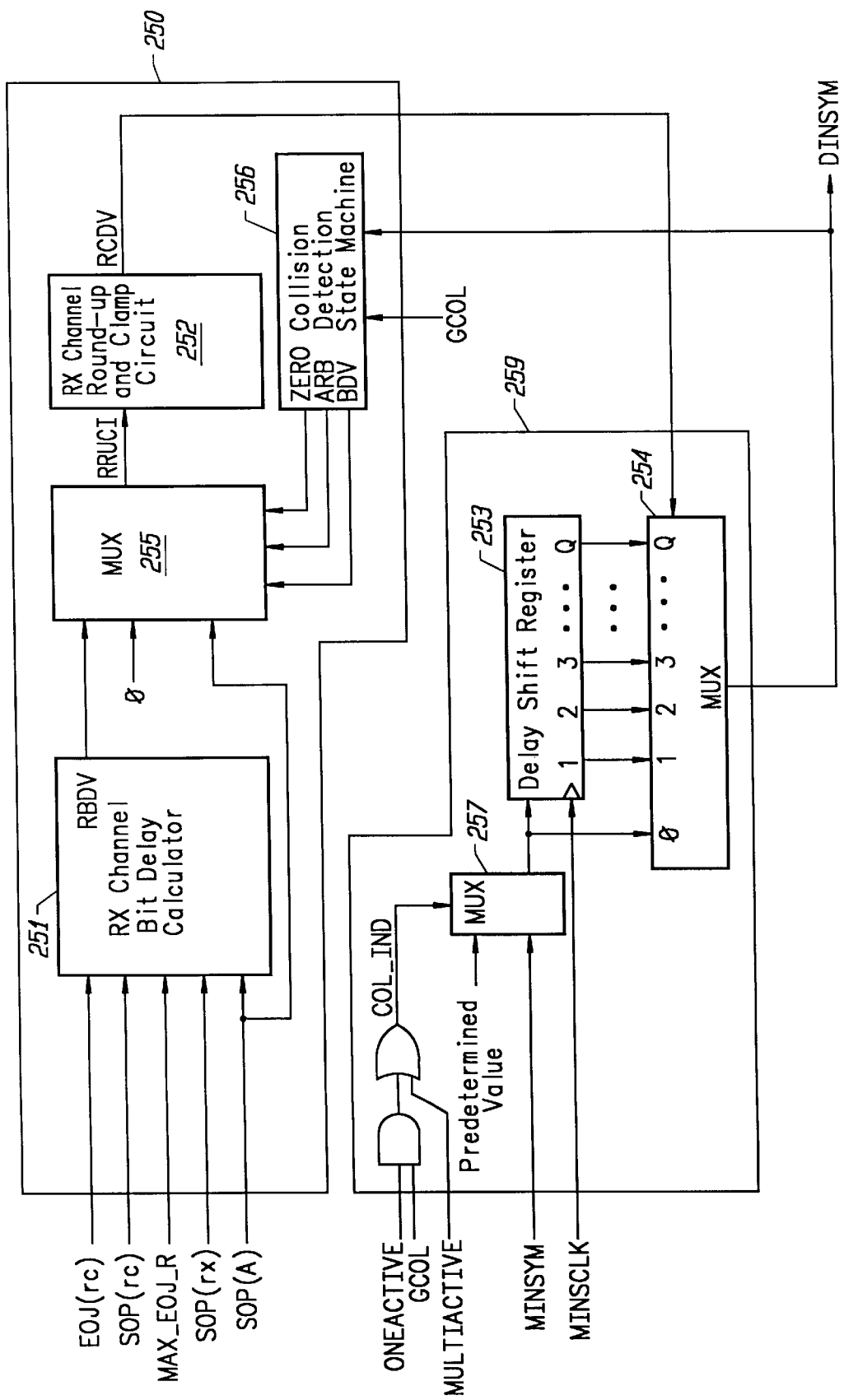
FIG. 18 illustrates circuitry for the receive channel delay circuit shown in FIG. 17.

FIG. 18 illustrates circuitry that may be employed in the receive channel delay circuit 178. The receive channel delay module 259 includes a delay shift register 253 having a set of data inputs coupled to receive the MINSYM signal provided by the repeater unit 141. The shift register's data input includes at least as many bits as are included in the MINSYM signal. In one embodiment of the present invention, MINSYM includes 5 bits.

The MINSYM signal is coupled to the delay shift register 253 through a DATA multiplexer 257. The DATA multiplexer enables a predetermined value to placed on the DINSYM signal when a collision condition is detected. As a result, the DATA signal will provide the predetermined value to the expansion bus 161, so that all the repeater sets in the logical repeater set 160 are aware of the collision.

The MINSYM signal is coupled to one data input of the DATA multiplexer 257, and another input of the DATA multiplexer is coupled to the predetermined value. In one embodiment of the present invention, the predetermined value is 00000. A select signal on the DATA multiplexer 257 is coupled to a collision indicator signal COL_IND. The COL_IND signal is asserted when either the MULTIACTIVE signal is asserted or the ONEACTIVE and GCOL signals are both asserted.

When COL_IND is asserted, the predetermined value is provided on an output of the DATA multiplexer 257. When the COL_IND signal is not asserted, the MINSYM signal is provided on the output of the DATA multiplexer 257. The output of the DATA multiplexer 257 is coupled to the data input of the delay shift register 253.

The delay shift register 253 also includes a clock input for signaling that the data at the input of the shift register 253 should be shifted into the shift register. The shift register's clock input may coupled to a clock used for shifting MINSYM signals, such as the MINSCLK clock. In one embodiment of the present invention, the clock has a period equal to a character time.

The shift register 253 is Q number of bits deep and includes Q number of outputs. Each one of the shift register's outputs includes the same number of bits as the input to the delay shift register 253. Each one of the Q number of outputs is coupled to a respective input of a delay multiplexer 254, which is also included in the receive channel delay module 259.

The delay multiplexer 254 includes Q+1 inputs. One of these inputs is connected to the data input of the delay shift register 253 to receive a real time version of either MINSYM or the predetermined value. Each input of the delay multiplexer 254 includes at least as many bits as the data input of the delay shift register 253.

The delay multiplexer 254 includes an output, which provides delayed MINSYM signals DINSYM. The delay multiplexer 254 also includes a select input, which is coupled to an output of the receive channel delay calculator 250. The output of the receive channel delay calculator 250 provides the receive channel character delay value for the repeater set 140. The delay multiplexer 254 selects the input that is indicated by the receive channel character delay value and provides this input on the delay multiplexer 254 output.

For example, if the receive channel delay calculator 250 output provides a value of Q, the delay multiplexer 254 selects its Q input, which is coupled to the delay shift register's Q output. As a result, the output of the delay multiplexer 254 provides the DINSYM output with a MIN-SYM signal that has been delayed in the shift register 253 for a period of Q number of shift register clock cycles.

The receive channel delay calculator 250 has a set of inputs for receiving the outputs of the following: the output the receive port multiplexer 212, which provides a value in one of the SOP(rx) data storage elements $213_{1-X}$, the output of the SOP(rc) data storage element 185, the output of the EOJ(rc) data storage element 182, the output of the SOP(A) data storage element 181, and the output of the MAX_EOJ_R data storage element 216. All of these inputs are then supplied to a receive channel bit delay calculator 251, which is in the receive channel delay calculator 250.

The receive channel bit delay calculator 251 combines these inputs in accordance with Equation 1 to obtain a receive channel bit delay value. The receive channel bit belay value in then provided to the input of a collision multiplexer 255, which allows the receive channel delay to be reduced when a collision condition is detected in the logical repeater set 160.

The collision multiplexer 255 has two other inputs, with one being coupled to a predetermined collision value, such as zero, and another coupled to the output of the SOP(A) data storage element 181. A set of select inputs for the collision multiplexer 255 is coupled to a set of outputs from a collision detection state machine 256.

Figure 19:
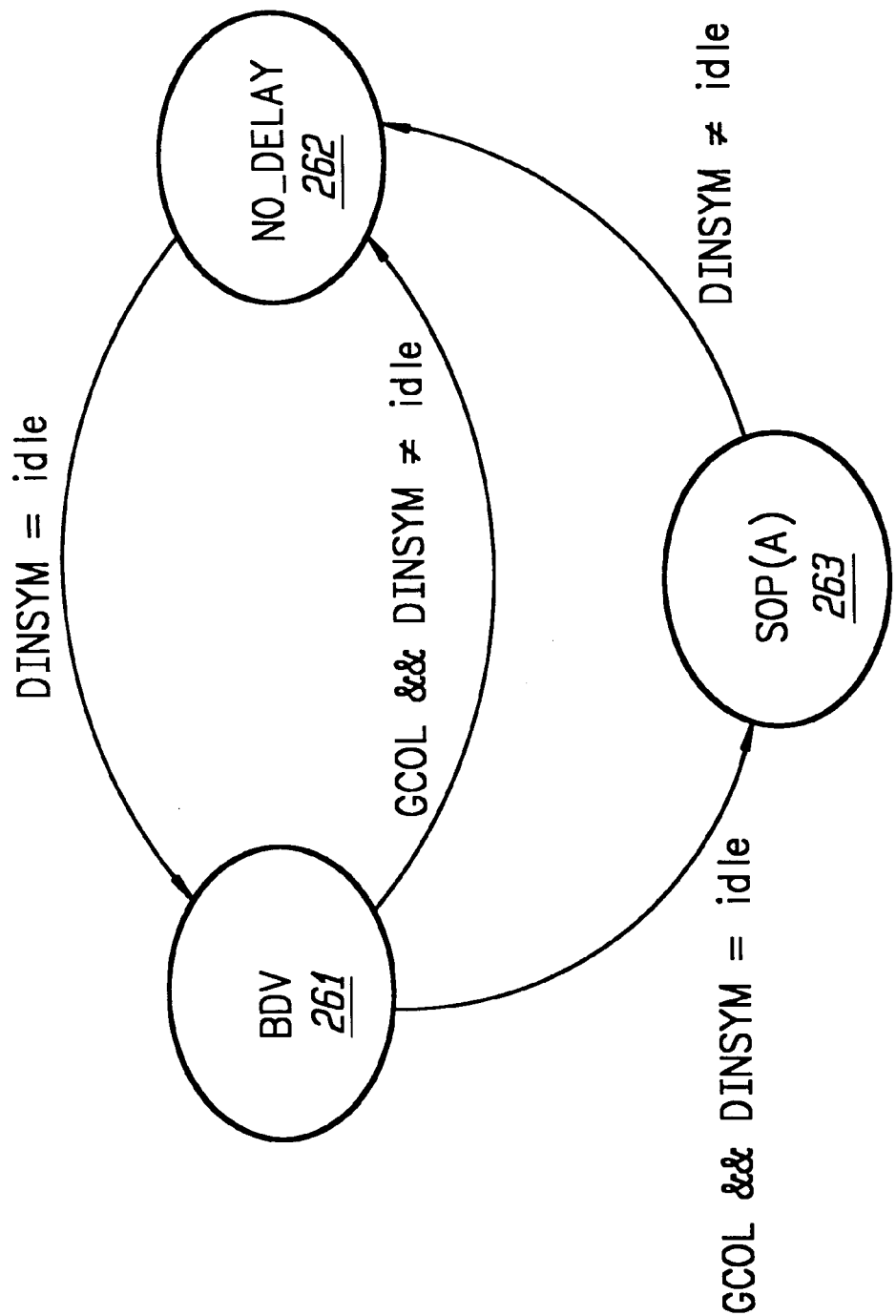
FIG. 19 illustrates a state diagram for the collision detection state machine shown in FIG. 18.

FIG. 19 illustrates a state diagram for the collision detection state machine 256, which receives the GCOL signal and the DINSYM signal as inputs. The collision detection state machine 256 has three outputs (BDV, ARB, and ZERO) which are coupled to the select inputs of the collision multiplexer 255.

The BDV output is asserted to indicate the absence of a collision condition in the logical repeater set 160. The ARB signal is asserted to indicate that a collision condition is present, but since the DINSYM signal is indicating an idle state the arbitration time delay should still be implemented. The ZERO signal is asserted to indicate that no receive channel delay is necessary, since a collision condition exists and the DINSYM signal is not in an idle state.

An output of the collision multiplexer 255 is coupled to an input of a receive channel round-up and clamp circuit 252. When the BDV signal is asserted, the output of collision multiplexer 255 provides the output of the receive channel bit delay calculator 251 to the receive channel round-up and clamp circuit 252. When the ARB signal is asserted, the output of the collision multiplexer 255 provides the output of the SOP(A) data storage element 181 to the receive channel round-up and clamp circuit 252. When the ZERO signal is asserted, the output of collision multiplexer 255 provides a zero value to the receive channel round-up and clamp circuit 252.

Upon being powered on, the collision detection state machine 256 enters a BDV state 261. In the BDV state 261, the collision detection state machine 256 asserts a BDV output signal. Upon exiting the BDV state, the state machine 256 deasserts the BDV signal. The collision detection state machine 256 transitions from the BDV state 261 to the SOP(A) state 263 when GCOL is asserted and the DINSYM signal indicates an idle condition. The collision detection state machine 256 transitions from the BDV state 261 to the NO_DELAY state 262 when the GCOL signal is asserted and the DINSYM signal does not indicate an idle condition. Otherwise, the collision detection state machine 256 remains in the BDV state 261.

In the SOP(A) state 263, the ARB signal is asserted. When the state machine 256 exits the SOP(A) state 263, the ARB signal is deasserted. The collision detection state machine 256 transitions from the SOP(A) state 263 to the NO_DELAY state 262 when the DINSYM signal does not indicate an idle condition. Otherwise, the state machine 257 remains in the SOP(A) state 263.

In the NO_DELAY state 262, the ZERO signal is asserted. When the state machine 256 exits the NO_DELAY state 262, the ZERO signal is deasserted. The collision detection state machine 256 transitions from the NO_DELAY state 262 to the BDV state 261 when the DINSYM signal indicates an idle condition. Otherwise, the state machine 256 remains in the NO_DELAY state 262.

In one embodiment of the present invention, the transmit channel round-up and clamp circuit 232 converts the output of the collision detection multiplexer 255 into a receive character delay value in accordance with Equation 2. The receive channel character delay value is provided on an output of the receive channel round-up and clamp circuit 252, which forms the output of the receive channel delay calculator 250. In an alternate embodiment of the present invention, the receive channel round-up and clamp circuit 252 converts the receive channel bit delay value into a receive channel character delay value in accordance with Equation 3.

The B value used by the receive channel round-up and clamp circuit 252 is equal to the number of bits used to define a data character in the MINSYM signal. In the case of an IEEE 802.3u repeater set, B is equal to 4. Although the MINSYM signal may include 5 bits, this represents a 4 bit character encoded into a 5 bit data and control bit pattern. Further, the Q value may be equal to the number of outputs on the delay shift register 253.

One with ordinary skill in the art will recognize that many different circuits may be designed to perform the operations of both the transmit channel and receive channel bit delay calculators 231, 251 and both the transmit channel and receive channel round-up and clamp circuits 232, 252 by using traditional logic design principals. In fact, circuits for the bit delay calculators 231, 251 and the round-up and clamp circuits 232, 252 may be designed by employing traditional Verilog design tools and defining the inputs and outputs of these circuits along with the operations they are to perform in accordance with Equations 1–6.

Figure 20:
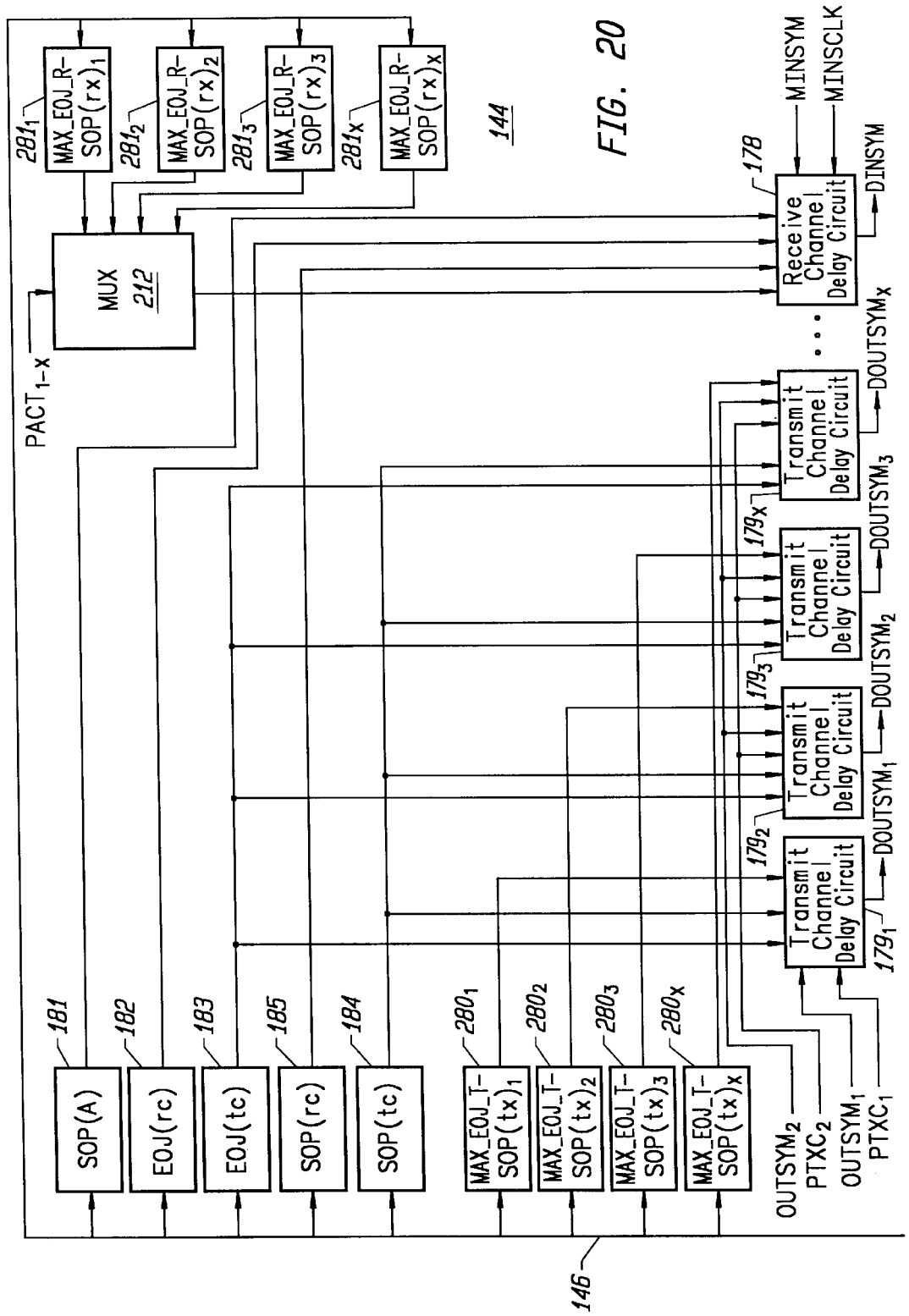
FIG. 20 illustrates an alternate embodiment of the delay generator circuit for the repeater set shown in FIG. 5.

FIG. 20 shows an alternate embodiment of the delay generator circuit 144 that eliminates some of the data storage elements. The MAX_EOJ_R data storage element 216 and the MAX_EOJ_T data storage element 215 may be deleted. Each one of the SOP(tx) data storage elements $214_{1-X}$ is replaced by a MAX_EOJ_T–SOP(tx) data storage element $280_{1-X}$. Each MAX_EOJ_T–SOP(tx) data storage element $280_{1-X}$ may be programmed to contain a value equal to the MAX_EOJ_T value minus the SOP(tx) value for a respective one of the transceivers $142_{1-X}$.

Each one of the SOP(rx) data storage elements $213_{1-X}$ is replaced by a MAX_EOJ_R–SOP(rx) data storage element $281_{1-X}$. Each MAX_EOJ_R–SOP(rx) data storage element $281_{1-X}$ may be programmed to contain a value equal to the MAX_EOJ_R value minus the SOP(rx) value for a respective one of the transceivers $102_{1-X}$.

Figure 21:
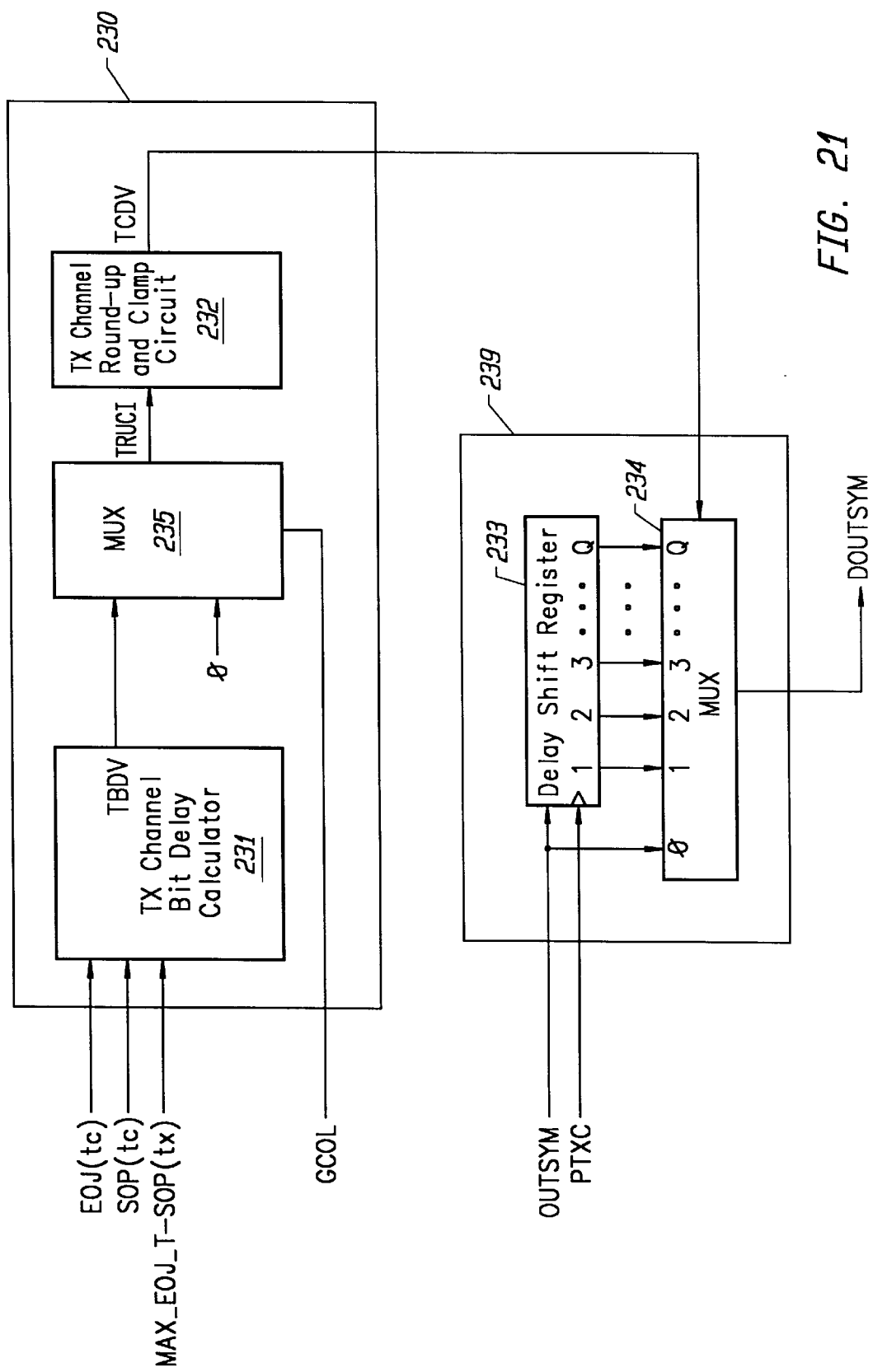
FIG. 21 illustrates circuitry for one of the transmit channel delay circuits shown in FIG. 20.

FIG. 21 illustrates circuitry for one of the transmit channel delay circuits $179_{1-X}$ in the delay generator circuit 144 shown in FIG. 20. The transmit channel delay circuit shown in FIG. 21 is the same as the circuit shown in FIG. 16, with the following exceptions. The input to the transmit channel delay calculator 230 for receiving the output of the MAX_EOJ_T data storage element 215 is deleted. The transmit channel delay calculator 230 input for receiving the output of the SOP(tx) data storage element 214 is replaced with an input for receiving the output of a MAX_EOJ_T-SOP(tx) data storage element 280.

Figure 22:
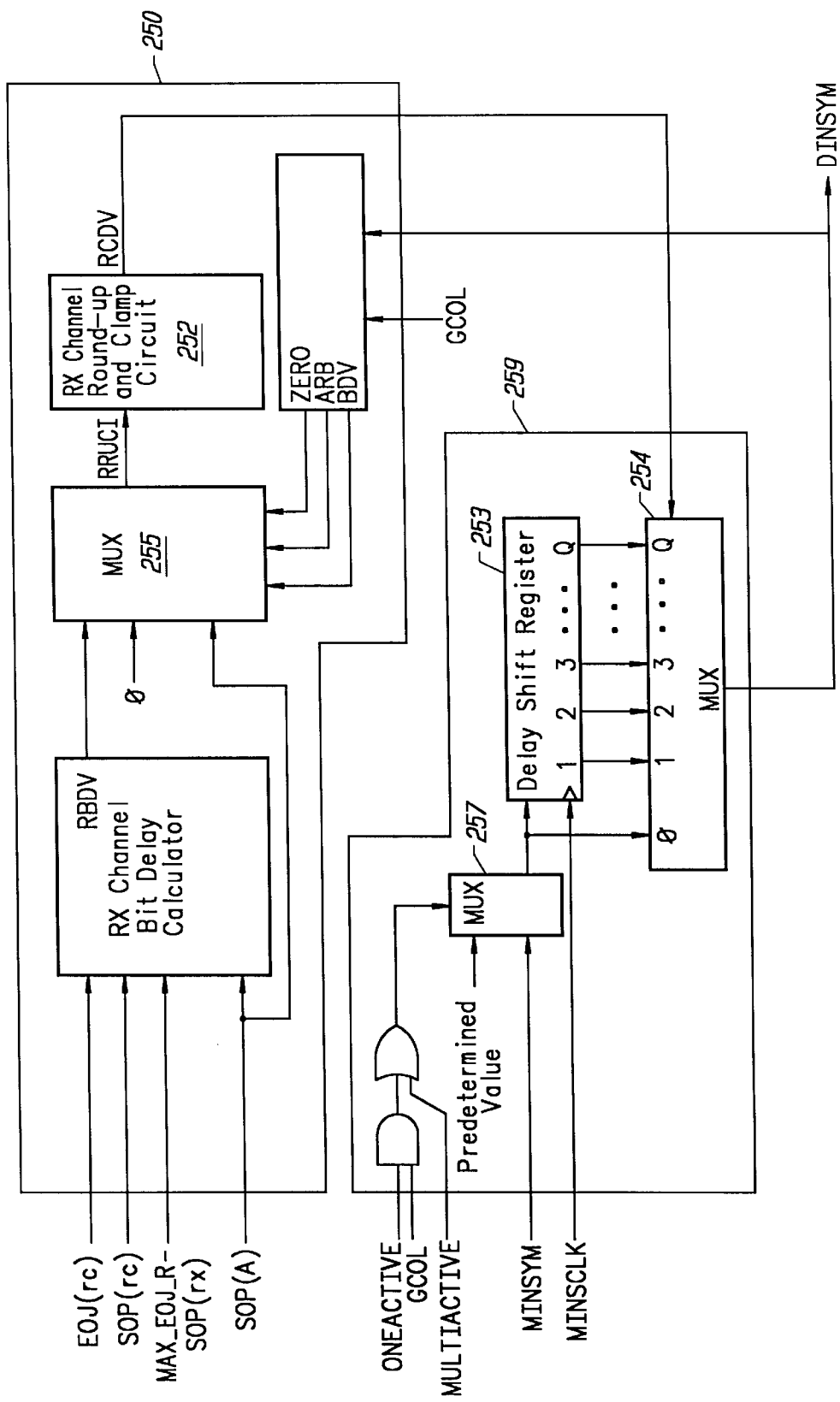
FIG. 22 illustrates a block diagram for the receive channel delay circuit shown in FIG. 19.

FIG. 22 illustrates circuitry for the receive channel delay circuit 178 in the delay generator circuit 144 shown in FIG. 20. The receive channel delay circuit shown in FIG. 22 is the same as the circuit shown in FIG. 18, with the following exceptions. The input to the receive channel delay calculator 250 for receiving the output of the MAX_EOJ_R data storage element 216 is deleted. The receive channel delay calculator 250 input for receiving the output of a SOP(rx) data storage element 213, via multiplexer 212, is replaced with an input for receiving the output of a MAX_EOJ_R-SOP(rx) data storage element 281. The output of the receive port multiplexer 212 provides a MAX_EOJ_R-SOP(rx) output value to the delay calculator 250.

D. Integration

In accordance with the present invention, any number of the transceivers may reside on an integrated circuit along with a repeater unit and delay generator circuit. Typically, the SOP(rx) for transceivers that are formed on the same integrated circuit are substantially the same. Similarly, the SOP(tx) for transceivers that are formed on the same integrated circuit are substantially the same. Accordingly, a single SOP(tx) value and a single SOP(rx) value may be used for transceivers that are formed on the same integrated circuit.

By employing a single SOP(rx) value and a single SOP (tx) value for multiple transceivers, the number of SOP(tx) data storage elements and SOP(rx) data storage elements may be reduced. A single SOP(tx) data storage element and SOP(rx) data storage element may be employed for all transceivers that are formed on the same integrated circuit.

Since a single set of SOP(tx) and SOP(rx) data storage elements may be employed for the transceivers on the same integrated circuit, a single transmit channel delay circuit may be used to calculate and apply a single transmit channel character delay for the DOUTSYM signals of the integrated transceivers. In such an embodiment, a single transmit channel delay circuit would receive a single SOP(tx) value for all of the integrated transceivers. The single transmit channel delay circuit for the integrated transceivers would then provide the same delayed OUTSYM signal DOUTSYM to the port interfaces for each of the integrated transceivers.

Additionally, the single SOP(rx) value for all of the integrated transceivers would be applied to a single input of the receive port multiplexer 212. This SOP(rx) value would be applied to the repeater set's receive channel delay circuit when any one of the integrated transceivers is providing data to the repeater set.

Since the SOP(rx) and SOP(tx) values for the integrated transceivers are known by the integrated circuit's manufacturer, the data storage elements for the integrated transceivers' SOP(tx) and SOP(rx) values can be loaded during the manufacture of the integrated circuit. This avoids the need for coupling the SOP(rx) and SOP(tx) data storage elements for the integrated transceivers to the user interface bus.

Similarly, the MAX_EOJ_T-SOP(tx) values are substantially the same for a set of integrated transceivers, and the MAX_EOJ_R-SOP(rx) values are substantially the same for a set of integrated transceivers. In embodiments of the present invention that employ these values and include integrated transceivers, the same design alterations may be achieved in the same manner as described above for the embodiments employing SOP(tx) and SOP(rx) values.

Accordingly, circuitry in the repeater set may be reduced, by sharing data storage elements and signal delay elements among several ports that have integrated transceivers. Such a reduction in circuitry may enable the cost of manufacturing the repeater set to be reduced.

Although the present invention has been described with reference to a logical repeater set 160 in conformance with the IEEE 802.3u Standard, one with ordinary skill in the art will recognize that the present invention is applicable to repeater sets and other types of data controllers that are not within the scope of the IEEE 802.3u Standard. In particular, embodiments of the present invention may be employed for delaying characters that include other than four data bits and are transmitted at frequencies of other than 100 Megabits per second.

This Application is related to U.S. patent application, entitled REPEATER DELAY BALANCING, by William Lo, U.S. patent application Ser. No. 08/791,857, filed the same day as this patent application, which is incorporated herein by reference.

Although the invention has been described above with particularity, this was merely to teach one of ordinary skill in the art to make and use the invention. Many modifications will fall within the scope of the invention, as that scope is defined by the following claims.

What is claimed is:

1. A method for delaying a character in a logical repeater set, said method comprising the steps of:

(a) receiving said character in a receiving repeater set;

(b) determining a receive channel character delay value in said receiving repeater set in response to receiving said character;

(c) delaying said character for a period of time equal to said receive channel character delay value;

(d) providing said character to a transmitting repeater set;

(e) determining a transmit channel character delay value in response to said character being provided in step (d);

(f) delaying said character for a period of time equal to said transmit channel character delay value; and (g) providing said character to a transmit channel of a transceiver in the transmitting repeater set.

2. The method of claim 1, wherein said step (b) includes determining a receive bit delay value by performing the following calculation:

$$RBDV = MAX\_EOJ\_R + EOJ(rc) - SOP(rx) + SOP(A) -$$

$$SOP(rc), \text{ if } MAX\_EOJ\_R + EOJ(rc) - SOP(rx) +$$

$$SOP(A) - SOP(rc) \text{ is greater than 0, else}$$

$$RBDV = 0$$

wherein:

RBDV is said receive bit delay value for a receiving repeater set in the logical repeater set, MAX_EOJ_R is a value equal to or greater than a largest cessation-of-collision JAM (EOJ) propagation delay value for a receive channel of any transceiver (EOJ(rx)) in the logical repeater set, SOP(rx) is a value substantially equal to a start-of-packet (SOP) propagation delay value of a receive channel of a transceiver (SOP(rx)) in said receiving repeater set that is providing information to the receiving repeater set, SOP(A) is an arbiter time delay for the logical repeater set, EOJ(rc) is a value substantially equal to a EOJ value of a repeater unit and an expansion port in the receiving repeater set, and SOP(rc) is a value substantially equal to a SOP value of a repeater unit and an expansion port in the receiving repeater set.

3. The method of claim 2, wherein said step (b) further includes connecting the receive bit delay value into the receive channel character delay value using the following calculation:

$$RCDV = \text{INT}[RBDV/B], \text{ if INT}[RBDV/B] \text{ is less than}$$
$$\text{or equal to } Q, \text{ else } RCDV = Q.$$

wherein:
RCDV is said receive channel character delay value,
B is a number of bits in said character,
INT[RBDV/B] is equal to a quotient of RBDV divided by B, if the quotient is an integer, else INT[RBDV/B] is equal to an integer portion of the quotient plus 1, and
Q is a maximum allowable number of delay periods.

4. The method of claim 2, wherein said step (b) further includes converting the receive bit delay value into the receive channel character delay value using the following calculation:

$$RCDV=\text{INT}[RBDV/B]$$

wherein:
RCDV is said receive channel character delay value,
B is a number of bits in said character, and
INT[RBDV/B] is equal to a quotient of RBDV divided by B, if the quotient is an integer, else INT[RBDV/B] is equal to an integer portion of the quotient plus 1.

5. The method of claim 1, wherein the receiving repeater set and the transmitting repeater set are both provided using one repeater set.

6. The method of claim 1, wherein step (e) includes determining a transmit channel bit delay value by performing the following calculation:

$$TBDV = MAX\_EOJ\_T + EOJ(tc) - SOP(tx) - SOP(tc), \text{ if}$$
$$MAX\_EOJ\_T + EOJ(tc) - SOP(tx) - SOP(tc) \text{ is}$$
$$\text{greater than } 0, \text{ else } TBDV = 0$$

wherein:
TBDV is said transmit channel bit delay value for a port in a transmitting repeater set in the logical repeater set,
MAX_EOJ_T is a value equal to or greater than a largest EOJ value for a transmit channel of any transceiver (EOJ(tx)) in the logical repeater set,
SOP(tx) is a value substantially equal to a SOP value of a transmit channel of a transceiver in said transmitting repeater set for which TBDV is being calculated,
EOJ(tc) is a value substantially equal to an EOJ value of a repeater unit and an expansion port in the transmitting repeater set, and SOP(rc) is a value substantially equal to a SOP value of a repeater unit and an expansion port in the transmitting repeater set.

7. The method of claim 6, wherein step (e) further includes using the transmit channel bit delay value to calculate the transmit channel character delay value using the following calculation:

$$TCDV = \text{INT}[TBDV/B], \text{ if INT}[TBDV/B] \text{ is less than}$$
$$\text{or equal to } Q, \text{ else } TCDV = Q.$$

wherein:
TCDV is said transmit channel character delay value;
B is a number of bits in said character,
INT[TBDV/B] is equal to a quotient of TBDV divided by B, if the quotient is an integer, else INT[TBDV/B] is equal to an integer portion of the quotient plus 1, and
Q is a maximum allowable number of delay periods.

8. The method of claim 6, wherein step (e) further includes using the transmit channel bit delay value to calculate the transmit channel character delay value using the following calculation:

$$TCDV=\text{INT}[TBDV/B]$$

wherein:
TCDV is said transmit channel character delay value,
B is a number of bits in said character, and
INT[TBDV/B] is equal to a quotient of TBDV divided by B, if the quotient is an integer, else INT[TBDV/B] is equal to an integer portion of the quotient plus 1.

9. The method of claim 1, wherein said step (a) includes the step of:
indicating that a receiving port in the receiving repeater set is receiving data;
asserting a port active signal while data is being received by said receiving port; and
maintaining the assertion of said port active signal until a delay time after data is no longer being received by said receiving port.

10. The method of claim 9, wherein said delay time is equal to or greater than said receive channel character delay value.

11. The method of claim 1 wherein the step (d) of providing the character to a transmitting repeater set includes the step of:
providing said character onto an expansion bus.

12. The method of claim 11 wherein said step of providing said character onto an expansion bus includes the steps of:
requesting access to the expansion bus for driving said character onto the expansion bus;
waiting for a contention delay period after said step of requesting access; and
driving said character onto the expansion bus after said step of waiting for a contention delay period and access to said expansion bus is granted.

13. The method of claim 12, wherein said contention delay is equal to or greater than said receive channel character delay value.

14. The method of claim 13, wherein said receive channel character delay value is equal to an arbiter time delay.

15. The method of claim 11 wherein step (d) further includes the step of:
providing a predetermined collision character onto the expansion bus in the logical repeater set when a collision condition exists at a port of the logical repeater set.

16. A repeater set including a repeater unit coupled to a plurality of transceivers, each one of said plurality of transceivers having a receive channel coupled to said repeater unit and a transmit channel coupled to said repeater unit, said repeater set being for use in a logical repeater set in which said repeater set is coupled to other repeater sets by an expansion bus, said repeater set comprising:

a receive channel delay calculator having an output for providing a receive channel character delay value;

a receive channel delay module having a data input coupled to the receive channel of one of the transceivers to receive a receive character to be delayed, a delay input coupled to said output of said receive channel delay calculator and an output for providing a delayed version of said receive character, said receive channel delay module delaying said receive character by said receive channel character delay value in said repeater set in response to receiving said receive character; and an expansion port having a receive data input coupled to said output of said receive channel delay module, and an expansion bus data interface for coupling to said expansion bus, said expansion port providing said delayed version of said receive character on said expansion bus data interface.

17. The repeater set of claim 16, wherein said expansion port includes:

means for requesting permission to provide said receive character onto said expansion bus data interface; and means for waiting for at least a contention delay period after making said request before driving said receive character onto said expansion bus data interface.

18. The repeater set of claim 17, wherein the logical repeater set includes an arbiter coupled to said repeater set, wherein said contention delay period is equal to or greater than an arbiter time delay for the arbiter to determine ownership of the expansion bus.

19. The repeater set of claim 17, wherein said contention delay period is equal to or greater than said receive channel character delay value.

20. The repeater set of claim 17, further including:

an arbiter time delay data storage element having an output coupled to said receive channel delay calculator, the data storage element storing a value representing the arbiter time delay.

21. The repeater set of claim 16, wherein said receive channel delay module includes:

a shift register having an input coupled to said data input of said receive channel delay module, said shift register having a plurality of outputs; and a delay multiplexer having a plurality of data inputs, a select input forming said delay input, and an output forming said output of said delay module, wherein at least one of said plurality of data inputs is coupled to a respective one of said plurality of outputs of said shift register.

22. The repeater set of claim 21, wherein said delay module further includes a data multiplexer having a first input providing a predetermined value, a second input forming said data input of said receive channel delay module, and an output coupled to said input of said shift register, said first input being provided on said output of said data multiplexer when a collision conditions exists in a logical repeater set including said repeater set and at least one port in said repeater set is receiving data.

23. The repeater set of claim 16, wherein said receive channel delay calculator includes a receive channel bit delay calculator for calculating a receive channel bit delay value using the following equation:

$$RBDV = MAX\_EOJ\_R + EOJ(rc) - SOP(rx) + SOP(A) -$$
$$SOP(rc), \text{ if } MAX\_EOJ\_R + EOJ(rc) - SOP(rx) +$$
$$SOP(A) - SOP(rc) \text{ is greater than 0, else}$$
$$RBDV = 0$$

wherein:

RBDV is said receive channel character bit delay value,

MAX_EOJ_R is a value equal to or greater than a largest cessation-of-collision JAM (EOJ) propagation delay value for a receive channel of any transceiver (EOJ(rx)) in the logical repeater set that includes said repeater set, SOP(rx) is a value substantially equal to a start-of-packet (SOP) propagation delay value of a receive channel of a transceiver in said plurality of transceivers that is providing information to said repeater set, SOP(A) is an arbiter time delay for the logical repeater set, EOJ(rc) is a value substantially equal to an EOJ value of the repeater unit and the expansion port of said repeater set, and SOP(rc) is a value substantially equal to a SOP value of the repeater unit and the expansion port of said repeater set.

24. The repeater set of claim 23, wherein said receive channel delay calculator further includes a receive channel round-up and clamp circuit having an input coupled to said output of said receive channel bit delay calculator to receive said receive channel bit delay value, and an output coupled to said delay input, wherein said receive channel round-up and clamp circuit converts a value provided to said input of said receive channel round-up and clamp circuit into said receive channel character delay value and provides said receive channel character delay value on said output of said receive channel round-up and clamp circuit.

25. The repeater set of claim 24, wherein said receive channel round-up and clamp circuit converts said value provided to said input of said receive channel round-up and clamp circuit into said receive channel character delay value in accordance with the following equation:

$$RCDV = INT[RRUCI/B], \text{ if } INT[RRUCI/B] \text{ is less}$$
$$\text{than or equal to } Q, \text{ else } RCDV = Q.$$

wherein:

RCDV is said receive channel character delay value,

RRUCI is said value provided to said input of said receive channel round-up and clamp circuit, B is a number of bits in said receive character, INT[RRUCI/B] is equal to a quotient of RRUCI divided by B, if the quotient is an integer, else INT[RRUCI/B] is equal to an integer portion of the quotient plus 1, and Q is a maximum allowable number of delay periods.

26. The repeater set of claim 24, wherein said receive channel round-up and clamp circuit converts said value provided to said input of said receive channel round-up and clamp circuit into said receive channel character delay value in accordance with the following equation:

$$RCDV = INT[RRUCI/B]$$

wherein:
RCDV is said receive channel character delay value,
RRUCI is said value provided to said input of said receive channel round-up and clamp circuit,
B is a number of bits in said receive character, and
INT[RRUCI/B] is equal to a quotient of RRUCI divided by B, if the quotient is an integer, else INT[RRUCI/B] is equal to an integer portion of the quotient plus 1.

27. The repeater set of claim 24, wherein said receive channel delay calculator further includes a collision multiplexer having a first input coupled to said output of said receive channel bit delay calculator, a second input coupled to a predetermined collision value, a third input coupled to an output of an arbiter time delay data storage element, and an output coupled to said input of said receive channel round-up and clamp circuit.

28. The repeater set of claim 27, wherein said second input of said collision multiplexer is provided on said output of said collision multiplexer when there is a collision condition in the logical repeater set including said repeater set and said output of said delay module is not idle, and wherein said third input of said collision multiplexer is provided on said output of said collision multiplexer when there is a collision condition in said logical repeater including said repeater set and said output of said delay module is idle.

29. The repeater set of claim 16, further including:
a transmit channel delay calculator having an output for providing a transmit channel character delay value; and
a transmit channel delay module having a data input for receiving a delayed receive character from said expansion bus, a delay input coupled to said output of said transmit channel delay calculator and an output for providing a delayed version of said delayed receive character, said transmit channel delay module delaying said delayed receive character in response to said transmit channel character delay value.

30. The repeater set of claim 29, wherein said output of said transmit channel delay module is coupled to transmit channels of at least two transceivers in said plurality of transceivers.

31. The repeater set of claim 29, wherein said transmit channel delay module includes:
a shift register having an input coupled to said data input of said transmit channel delay module, said shift register having a plurality of outputs; and
a delay multiplexer having a plurality of data inputs, a select input forming said delay input, and an output forming said output of said transmit channel delay module, wherein at least one of said plurality of data inputs is coupled to a respective one of said plurality of outputs of said shift register in said transmit channel delay module.

32. The repeater set of claim 29, wherein said transmit channel delay calculator includes a transmit channel bit delay calculator for calculating a transmit channel bit delay value using the following equation:

$$TBDV = MAX\_EOJ\_T + EOJ(tc) - SOP(tx) - SOP(tc), \text{ if}$$
$$MAX\_EOJ\_T + EOJ(tc) - SOP(tx) - SOP(tc) \text{ is}$$
$$\text{greater than 0, else } TBDV = 0$$

wherein:
TBDV is said transmit channel bit delay value for a transmit channel of a transceiver in said plurality of transceivers, MAX_EOJ_T is a value equal to or greater than a largest EOJ value for a transmit channel of any transceiver (EOJ(tx)) in the logical repeater set including said repeater set,
SOP(tx) is a value substantially equal to a SOP value of said transmit channel of said transceiver in said plurality of transceivers for which TBDV is being calculated,
EOJ(tc) is a value substantially equal to an EOJ value of the repeater unit and the expansion port in said repeater set, and
SOP(rc) is a value substantially equal to a SOP value of the repeater unit and the expansion port in said repeater set.

33. The repeater set of claim 32, wherein said transmit channel delay calculator further includes a transmit channel round-up and clamp circuit having an input coupled to said output of said transmit channel bit delay calculator to receive said transmit channel bit delay value, and an output coupled to said delay input of said transmit channel delay module, wherein said transmit channel round-up and clamp circuit converts a value provided to said input of said transmit channel round-up and clamp circuit into a transmit channel character delay value and provides said transmit channel character delay value on said output of said transmit channel round-up and clamp circuit.

34. The repeater set of claim 33, wherein said transmit channel round-up and clamp circuit converts said value provided to said input of said transmit channel round-up and clamp circuit into said transmit channel character delay value in accordance with the following equation:

$$TCDV = INT[TRUCI/B], \text{ if } INT[TRUCI/B] \text{ is less}$$
$$\text{than or equal to } Q, \text{ else } TCDV = Q.$$

wherein:
TCDV is said transmit channel character delay value,
TRUCI is said value provided to said input of said transmit channel round-up and clamp circuit,
B is a number of bits in said delayed receive character,
INT[TRUCI/B] is equal to a quotient of TRUCI divided by B, if the quotient is an integer, else INT[TRUCI/B] is equal to an integer portion of the quotient plus 1, and
Q is a maximum allowable number of delay periods.

35. The repeater set of claim 33, wherein said transmit channel round-up and clamp circuit converts said transmit channel bit delay value into said transmit channel character delay value in accordance with the following equation:

$$TCDV = INT[TRUCI/B]$$

wherein:
TCDV is said transmit channel character delay value,
TRUCI is said value provided to said input of said transmit channel round-up and clamp circuit,
B is a number of bits in said delayed receive character, and
INT[TRUCI/B] is equal to a quotient of TRUCI divided by B, if the quotient is an integer, else INT[TRUCI/B] is equal to an integer portion of the quotient plus 1.

36. The repeater set of claim 33, wherein said transmit channel delay calculator further includes a collision multiplexer having a first input coupled to said output of said transmit channel bit delay calculator, a second input coupled to a predetermined collision value, and an output coupled to said input of said transmit channel round-up and clamp circuit.

37. The repeater set of claim 36, wherein said second input of said collision multiplexer is provided on said output of said collision multiplexer when there is a collision condition in the logical repeater set including said repeater set.

38. The repeater set of claim 16, further including:

a set of data storage elements having outputs coupled to said receive channel delay calculator.

39. The repeater set of claim 38, further including:

a user interface bus coupled to inputs of a portion of data storage elements in said set of data storage, for providing data to said data storage elements.

40. The repeater set of claim 29, further including:

a set of data storage elements having outputs coupled to said transmit channel delay calculator.

41. The repeater set of claim 40, further including:

a user interface bus coupled to inputs of a portion of data storage elements in said set of data storage, for providing data to said data storage elements.

* * * * *